United States Patent
Qasim et al.

(10) Patent No.: US 11,692,659 B2
(45) Date of Patent: Jul. 4, 2023

(54) COMBINED DRILLING AND STOPPING SYSTEM

(71) Applicant: Mueller International, LLC, Atlanta, GA (US)

(72) Inventors: Mohammad Unnus Qasim, Decatur, IL (US); Yixin Li, Savoy, IL (US); Ryan Fairchild Larson, Decatur, IL (US)

(73) Assignee: Mueller International, LLC, Atlanta, GA (US)

( * ) Notice: Subject to any disclaimer, the term of this patent is extended or adjusted under 35 U.S.C. 154(b) by 0 days.

(21) Appl. No.: 17/704,657

(22) Filed: Mar. 25, 2022

(65) Prior Publication Data
US 2022/0307641 A1    Sep. 29, 2022

Related U.S. Application Data

(60) Provisional application No. 63/166,436, filed on Mar. 26, 2021.

(51) Int. Cl.
*F16L 55/105* (2006.01)
*F16L 41/06* (2006.01)
(Continued)

(52) U.S. Cl.
CPC ............ *F16L 55/105* (2013.01); *F16L 41/06* (2013.01); *B23B 41/00* (2013.01); *B23B 51/08* (2013.01);
(Continued)

(58) Field of Classification Search
CPC ........ F16K 5/0242; F16K 5/163; F16K 5/167; F16K 5/185; F16L 41/04; F16L 41/06;
(Continued)

(56) References Cited

U.S. PATENT DOCUMENTS 860,217 A * 7/1907 Jackson ................ F16K 27/045
251/188
2,655,339 A * 10/1953 Smith ....................... F16K 3/22
137/317
(Continued)

FOREIGN PATENT DOCUMENTS

GB          253229 A * 6/1926 .............. F16L 41/06
WO    2022204538       9/2022

OTHER PUBLICATIONS

Qasim, Mohammad Unnus; International Search Report and Written Opinion for PCT Application No. PCT/US22/21989, filed Mar. 25, 2022, dated Jun. 21, 2022, 12 pgs.
(Continued)

*Primary Examiner* — Robert K Arundale
*Assistant Examiner* — Richard K. Durden
(74) *Attorney, Agent, or Firm* — Taylor English Duma LLP

(57) ABSTRACT

A machine includes a tool housing defining a housing cavity; a first tool coupled to a first linear drive mechanism, the first tool linearly repositionable along an axis by the first linear drive mechanism about and between a first retracted position and an extended position, the first tool positioned within the housing cavity in the first retracted position, the first tool positioned external to the housing cavity in the extended position; and a second tool coupled to a second linear drive mechanism, the second tool linearly repositionable along the axis by the second linear drive mechanism about and between a second retracted position and a sealing position, the second tool positioned within the housing cavity in the second retracted position, the second tool positioned external to the housing cavity in the sealing position.

16 Claims, 33 Drawing Sheets

(51) Int. Cl.
   *B23B 51/08* (2006.01)
   *B23B 41/00* (2006.01)
(52) U.S. Cl.
   CPC ..... *B23B 2215/72* (2013.01); *Y10T 137/0469* (2015.04); *Y10T 137/6123* (2015.04)
(58) Field of Classification Search
   CPC ....... F16L 47/34; F16L 47/345; F16L 55/105; F16L 55/124; Y10T 137/0469; Y10T 137/6123
   USPC ........................................ 251/161, 188, 189
   See application file for complete search history.

(56) References Cited

U.S. PATENT DOCUMENTS

| | | | | |
|---|---|---|---|---|
| 2,966,814 | A | * | 1/1961 | Mueller ................. F16L 41/06 408/239 R |
| 2,972,920 | A | * | 2/1961 | Milanovits .............. F16L 41/04 81/445 |
| 3,699,996 | A | | 10/1972 | Nichols |
| 3,993,137 | A | * | 11/1976 | Hefetz .................... E21B 29/08 166/69 |
| 4,431,017 | A | * | 2/1984 | Willemsen .............. F16L 41/06 408/100 |
| 4,516,598 | A | | 5/1985 | Stupak |
| 5,152,310 | A | | 10/1992 | O'Bryon |
| 5,183,364 | A | | 2/1993 | Hadwig |
| 5,472,011 | A | * | 12/1995 | St. Marie ................ F16K 43/00 137/315.18 |
| 5,483,990 | A | | 1/1996 | Martin |
| 5,620,020 | A | | 4/1997 | Collins |
| 5,676,171 | A | | 10/1997 | Heed |
| 6,041,806 | A | | 3/2000 | Maichel |
| 6,125,868 | A | | 10/2000 | Murphy et al. |
| 6,308,726 | B2 | | 10/2001 | Sato et al. |
| 6,622,747 | B2 | | 9/2003 | Sato et al. |
| 6,776,184 | B1 | | 8/2004 | Maichel et al. |
| 6,892,752 | B2 | | 5/2005 | Burlock et al. |
| 6,942,194 | B2 | | 9/2005 | Gravningen et al. |
| 6,983,759 | B2 | | 1/2006 | Maichel et al. |
| 7,021,325 | B2 | | 4/2006 | Maichel et al. |
| 7,073,776 | B2 | | 7/2006 | Mori |
| 7,104,572 | B1 | | 9/2006 | Kane |
| 7,225,827 | B2 | | 6/2007 | Maichel et al. |
| 7,270,139 | B2 | | 9/2007 | Calkins et al. |
| 7,628,176 | B2 | | 12/2009 | Waldo |
| 7,819,384 | B2 | | 10/2010 | Nakano et al. |
| 8,104,517 | B2 | | 1/2012 | German |
| 8,286,655 | B2 | | 10/2012 | Farrelly |
| 8,627,843 | B2 | | 1/2014 | Ries |
| 8,695,626 | B2 | | 4/2014 | Murphy et al. |
| 8,739,834 | B2 | | 6/2014 | German et al. |
| 9,052,050 | B2 | | 6/2015 | Ferrari |
| 9,638,336 | B2 | | 5/2017 | Murphy et al. |
| 9,644,779 | B2 | | 5/2017 | Vazzana et al. |
| 9,829,141 | B2 | | 11/2017 | Vazzana et al. |
| 9,964,461 | B2 | | 5/2018 | Hart et al. |
| 10,480,701 | B2 | | 11/2019 | Winborn |
| 10,619,747 | B2 | | 4/2020 | Vazzana et al. |
| 10,718,458 | B2 | | 7/2020 | Nelson et al. |
| 11,248,732 | B2 | | 2/2022 | Horikawa et al. |
| 11,248,992 | B2 | | 2/2022 | Vazzana et al. |
| 2013/0061943 | A1 | | 3/2013 | Ferrari |
| 2016/0193672 | A1 | | 7/2016 | Krokosz |
| 2019/0376632 | A1 | | 12/2019 | Rush et al. |
| 2020/0200280 | A1 | | 6/2020 | Kojima et al. |
| 2020/0408346 | A1 | | 12/2020 | Sato |
| 2021/0254772 | A1 | | 8/2021 | Kaneta et al. |
| 2021/0364116 | A1 | | 11/2021 | Yamanouchi |

OTHER PUBLICATIONS

Mueller Co.; Catalog pages for Catalog W-103, dated Nov. 18, 1966, 4 pgs.

Mueller Co.; Catalog for Inserting Valves and Equipment, publicly available prior to Mar. 25, 2022, 7 pgs.

Mueller Co.; Catalog for Special Purpose Main Fittings and Valves, publicly available prior to Mar. 25, 2022, 5 pgs.

Mueller Co.; Installation Instructions for Mueller Inserting Valves, Copyright 1968, 16 pgs.

Mueller; Flyer for Mueller Inserting Valves, publicly available prior to Mar. 25, 2022, 2 pgs.

Mueller; Flyer for Insertion Valve H-2361 Resilient Wedge Gate Valve (4"-12"), Copyright 2019, 1 pg.

Mueller; Drawings for 4 Inch Valve Body Insertion; assembly shown in drawings publicly available prior to Mar. 25, 2022, 7 pgs.

* cited by examiner

COMBINED DRILLING AND STOPPING SYSTEM

CROSS-REFERENCE TO RELATED APPLICATIONS

This application claims the benefit of U.S. Provisional Application 63/166,436, filed on Mar. 26, 2021, which is hereby incorporated in its entirety by reference.

TECHNICAL FIELD

This disclosure relates to a machine for a pipeline. More specifically, this disclosure relates to a combined drilling and stopping machine.

BACKGROUND

At times, during the operation of a pipeline, the operating company may stop the flow to a portion of the pipeline without taking the entire pipeline out of service. For example, if a branch line of the pipeline ruptured, the flow may be stopped to that branch without taking the whole pipeline offline. If a valve is conveniently positioned, the flow can be stopped by closing the valve. If no valve is conveniently placed, the operating company may drill and tap into the live, or hot, line, insert a stopper into the line to halt flow temporarily while the line is repaired, and then remove the stopper and complete the operation, such as by installing a plug.

Drilling, stopping, and completing the line is often performed as three discrete steps requiring three separate machines. For example, prior to the initiation of the operations, a fitting is typically sealed around the pipeline, and a valve is placed atop a flange of the fitting. Next, a dedicated drilling machine is coupled to the valve, the valve is opened, and the pipeline is then drilled. At the completion of the drilling operation after the drill is retracted, the valve is closed, and the drilling machine is removed from the valve. A stopping machine can then be attached in its place. Once attached, the valve can be opened and a stopper can be inserted into the line to halt the flow. Once the pipeline is ready to be placed back in service, the stopper can be withdrawn, the valve can be closed again, and the stopping machine can be removed from the valve. Next, a completion machine can be attached to the fitting, the valve can be opened, and a plug can be inserted into the flange of the fitting to seal the pipeline. The valve can then be closed, and both the valve and completion machine can be removed. A blind flange is then commonly attached to the flange of the fitting over the completion plug.

Each of the drilling machine, the stopping machine, and the completion machine can be a large, heavy, and expensive piece of equipment. Each machine can weigh hundreds of pounds, and changing the machines out can be a time consuming step requiring a hoist, crane, or other mechanical lifting mechanism. Due to their weight and size, changing out the machines can present a danger to persons and property in the vicinity. Additionally, the operating company must store, maintain, and transport multiple machines for such an operation.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is a machine comprising a tool housing defining a housing cavity; a first tool coupled to a first linear drive mechanism, the first tool linearly repositionable along an axis by the first linear drive mechanism about and between a first retracted position and an extended position, the first tool positioned within the housing cavity in the first retracted position, the first tool positioned external to the housing cavity in the extended position; and a second tool coupled to a second linear drive mechanism, the second tool linearly repositionable along the axis by the second linear drive mechanism about and between a second retracted position and a sealing position, the second tool positioned within the housing cavity in the second retracted position, the second tool positioned external to the housing cavity in the sealing position.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

DETAILED DESCRIPTION

Figure 1:
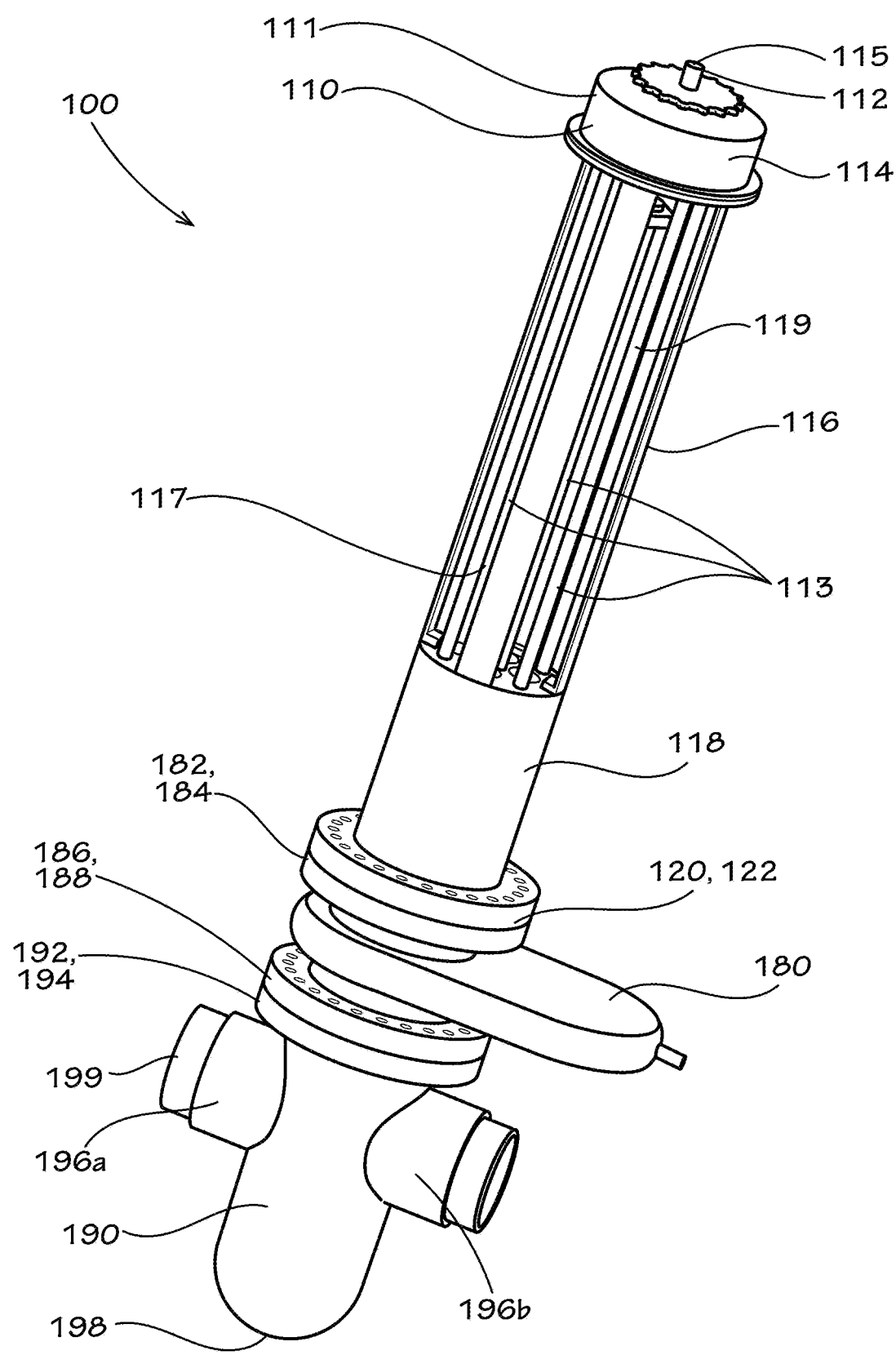
FIG. 1 is a perspective view of a combined drilling and stopping system (referred to hereafter as "the system") comprising a combined drilling and stopping machine (referred to hereafter as "the machine"), a valve, a fitting, and a pipeline in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed, that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a drilling and stopping system and associated methods, systems, devices, and various apparatus. The drilling and stopping system can comprise a combined drilling and stopping machine, a valve, a fitting, and a pipeline. It would be understood by one of skill in the art that the disclosed drilling and stopping system is described in but a few exemplary aspects among many. No particular terminology or description should be considered limiting on the disclosure or the scope of any claims issuing therefrom.

FIG. 1 is a perspective view of a combined drilling and stopping system 100 (referred to hereafter as "the system 100") comprising a combined drilling and stopping machine 110 (referred to hereafter as "the machine 110"), a valve 180, a fitting 190, and a pipeline 199 in accordance with one aspect of the present disclosure. The machine 110 can be configured to perform both drilling and stopping operations on the pipeline 199 without requiring removal from the valve 180 or changing over of any tooling of the machine 110.

The machine 110 can define a first end 112 and a second end 120, and the first end 112 can be positioned opposite from the second end 120. The machine 110 can comprise a body 111 and a plurality of drive mechanisms 113. The body 111 can comprise a top housing 114, a tool housing 118, and a plurality of standoffs 116.

The plurality of drive mechanisms 113 can comprise a drilling rotational drive mechanism 115, a drilling linear drive mechanism 117, and a stopper linear drive mechanism 119.

The first end 112 can be defined by a portion of one of the drive mechanisms 113, such as the drilling rotational drive mechanism 115, extending through the top housing 114, and the second end 120 can be defined by a flange 122 of the tool housing 118. In other aspects, the first end 112 can be defined by the top housing 114. For example and without limitation, the top housing 114 can enclose the drive mechanisms 113 at the first end 112. The drive mechanisms 113 can extend between the top housing 114 and the tool housing 118.

The flange 122 can couple the machine 110 to a first flange 182 of the valve 180. The first flange 182 can be defined at a first end 184 of the valve 180, and a second flange 186 of the valve 180 can be defined at a second end 188 of the valve 180. In the present aspect, the valve 180 can be a gate valve, such as a knife gate valve, for example and without limitation. In other aspects, the valve 180 can be a different type of valve, such as a ball valve, for example and without limitation.

The second flange 186 can couple the valve 180 to a flange 192 defined at a first end 194 of the fitting 190. The fitting 190 can be cross, or "t" shaped, with a trap 198 defined opposite from the flange 192, and a pair of sleeves 196a,b extending outwards from opposite sides of the fitting 190 between the flange 192 and the trap 198. The pipeline 199 can extend through the fitting 190, including each of the sleeves 196a,b. In the present aspect, the pipeline 199 is represented as a short length of pipe; however, the length of the pipeline 199 should not be viewed as limiting. The pipeline 199 can be any length, from a very short branch to a long-distance transmission line measured in hundreds or thousands of miles, for example and without limitation.

Figure 2:
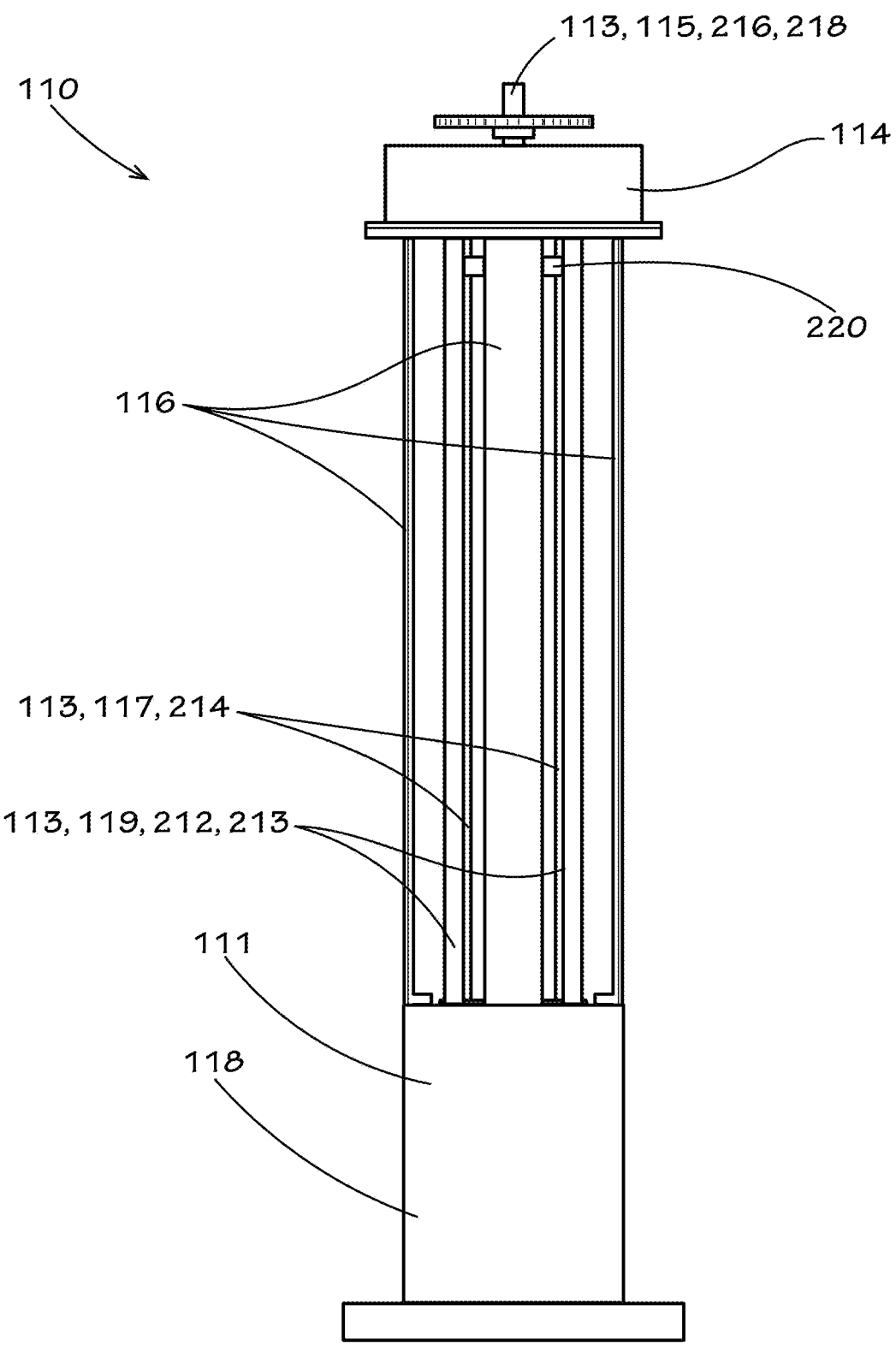
FIG. 2 is a front view of the machine of FIG. 1.

FIG. 2 is a front view of the machine 110 of FIG. 1.

The drilling rotational drive mechanism 115 can comprise a drilling bar assembly 216. The drilling bar assembly 216 can comprise an upper drilling bar 218, also referred to as an "upper rotating drilling bar," and a lower drilling bar 318, also referred to as a "lower boring bar" (shown in FIG. 3).

The drilling linear drive mechanism 117 can comprise a plurality of drilling guide rods 214 (partially obscured by the stopper guide assemblies 212 in the present viewing angle), and a drilling bar plate 220, also referred to as a "carrier." In the present aspect, the drilling linear drive mechanism 117 can comprise four drilling guide rods 214; however, in other aspects, the drilling linear drive mechanism 117 can comprise greater or fewer than four drilling guide rods 214.

The stopper linear drive mechanism 119 can comprise a plurality of stopper guide assemblies 212. Each stopper guide assembly 212 can comprise an upper guide member 213 and a lower guide member 313 (shown in FIG. 3). In the present aspect, the stopper linear drive mechanism 119 can comprise four stopper guide assemblies 212; however, in other aspects, the stopper linear drive mechanism 119 can comprise greater or fewer than four stopper guide assemblies 212.

The standoffs 116 can extend between the top housing 114 and the tool housing 118 to space apart and structurally support the top housing 114 and the tool housing 118. In the present aspect, the body 111 can comprise four standoffs 116; however, in other aspects, the body 111 can comprise greater or fewer than four standoffs 116. In some aspects, the body 111 can comprise a single standoff 116, such as a tube, which may also be referred to as a main housing of the body 111. In such aspects, the main housing may define access ports for accessing components of the drive mechanisms 113 enclosed within the main housing. Such access ports may be configured to remain open or to be closeable, such as with hinged or removable hatches, for example and without limitation.

The stopper guide assemblies 212, the drilling guide rods 214, and the drilling bar assembly 216 can extend between the top housing 114 and the tool housing 118. The stopper guide assemblies 212, the drilling guide rods 214, and the drilling bar assembly 216 can control movement of one or more tools positioned within the tool housing 118. For example, in the present aspect, the machine 110 can comprise a first tool, a drill bit 314, such as a cutter or shell cutter for example and without limitation, and a second tool, a stopper 312 (the stopper 312 and the drill bit 314 shown in FIG. 3). In other aspects, the machine 110 can comprise one or more different tools in place of either or both of the tools 312,314. The standoffs 116 can provide clearance to provide a necessary range of travel for each of the stopper guide assemblies 212, the drilling guide rods 214, and the drilling bar assembly 216, and in other aspects, these components can be longer or shorter than shown here.

Figure 3:
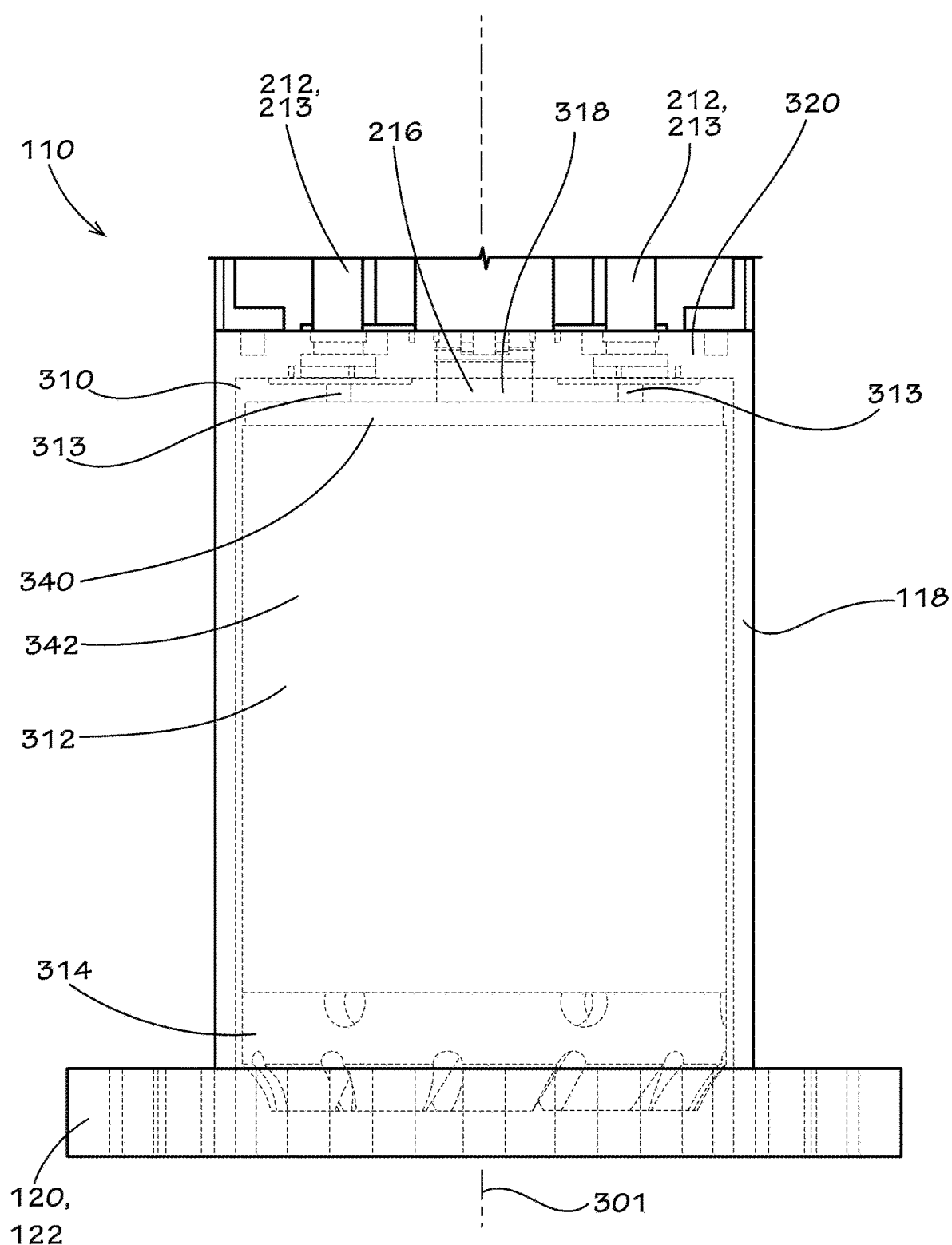
FIG. 3 is a detailed view of a tool housing, a stopper, and a drill bit of the machine of FIG. 1, with the tool housing shown in transparency and the stopper and the drill bit shown in respective retracted positions within a housing cavity defined by the tool housing.

FIG. 3 is a front detail view of the tool housing 118 of the machine 110, shown in partial transparency. As shown, the tool housing 118 can define a housing cavity 310 extending from the flange 122 at the second end 120 to an end wall 320 defined opposite from the flange 122. The stopper 312 and the drill bit 314 can be positioned within the housing cavity 310 when the stopper 312 and the drill bit 314 are each positioned in a respective retracted position, as shown.

The stopper 312 can comprise a stopper frame 340 and a stopper shell 342, which can be attached to the stopper frame 340. In the retracted position, the drill bit 314 can nest within the stopper 312. As shown, the stopper shell 342 can at least partially enclose the drill bit 314 when the stopper 312 and the drill bit 314 are each in their respective retracted positions.

The lower drilling bar 318 of the drilling bar assembly 216 can extend through the end wall 320, and the lower drilling bar 318 can couple to the drill bit 314. The drilling bar assembly 216 can define an axis 301, which can be an axis of rotation, and the upper drilling bar 218 (shown in FIG. 2) and the lower drilling bar 318 can be rotatable about the axis 301. The lower drilling bar 318 can be rotationally and axially fixed to the drill bit 314 relative to the axis 301. As described in greater detail below with respect to FIG. 6, the drill bit 314 and lower drilling bar 318 can be configured to translate along the axis 301 relative to the upper drilling bar 218 and the tool housing 118.

The upper guide members 213 of the stopper guide assemblies 212 can couple to and be axially fixed to the end wall 320, relative to the axis 301. The lower guide members 313 can extend through the end wall 320, and the lower guide members 313 can couple to and be axially fixed to the stopper 312. The lower guide members 313 can extend at least partially into the upper guide members 213. In the present aspect, the upper guide members 213 can be tubes and the lower guide members 313 can be rods. In some aspects, the lower guide members 313 can also be tubes, or hollow rods. In other aspects, the lower guide members 313 can be tubes, and the upper guide members 213 can be received within the lower guide members 313. The lower guide members 313 of each respective stopper guide assembly 212 can translate axially relative to the adjoining upper guide member 213 with respect to the axis 301. Each lower guide member 313 can also be rotated relative to the adjoining upper guide member 213 of the respective stopper guide assembly 212.

In the present aspect, some or all of the lower guide members 313 and upper guide members 213 can be complimentarily threaded to one another, and rotation of the guide members 213,313 relative to one another can result in and control axial translation of the respective guide members 213,313 relative to one another. For example and without limitation, some or all of the lower guide members 313 can be externally threaded rods or tubes, and some or all of the upper guide members 213 can be internally threaded tubes. For example and without limitation, some of the guide members 213,313 can be smooth, rather than threaded. The lower guide member 313 that threadedly engages the adjoining upper guide member 213 of the respective stopper guide assembly 212 can axially lengthen the stopper guide assembly 212 when the guide members 213,313 are rotated relative to one another in a first direction and axially shorten when the guide members 213,313 are rotated relative to one another in a second direction, opposite from the first direction.

In the present aspect, each lower guide member 313 can be rotationally fixed to the stopper 312 and rotationally fixed relative to the tool housing 118, and the upper guide members 213 can be rotatable relative to the stopper 312 and the tool housing 118. In some aspects, each upper guide member 213 can be rotationally fixed relative to the stopper 312 and rotationally fixed to the tool housing 118, and the lower guide members 313 can be rotatable relative to the stopper 312 and the tool housing 118.

By axially lengthening and shortening the stopper guide assemblies 212, axial translation of the stopper 312 along the axis 301 relative to the tool housing 118 can be controlled, as further discussed below in greater detail.

FIGS. 4-20 illustrate one exemplary method for using the system 100 and the machine 110 of FIG. 1.

Figure 4:
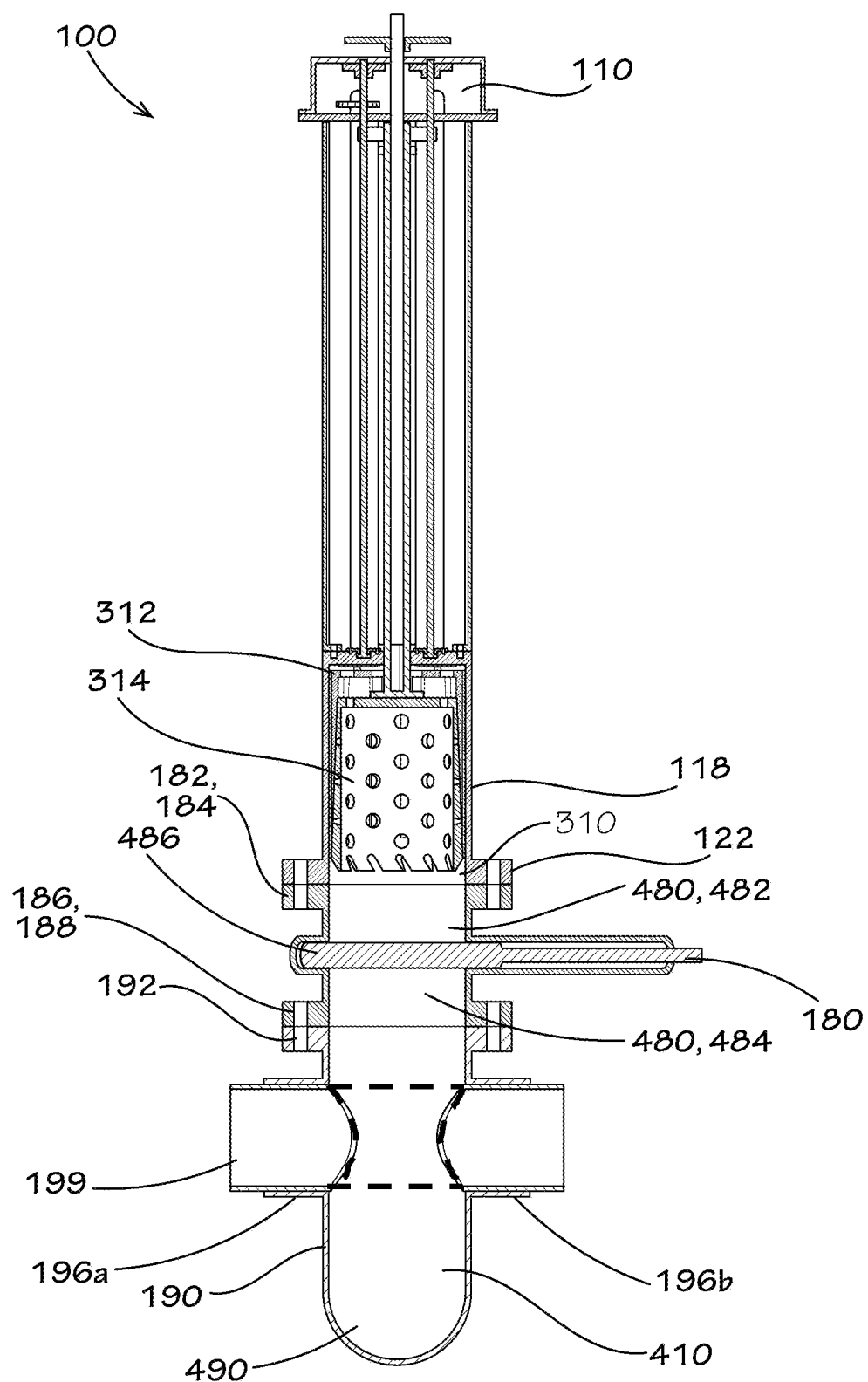
FIG. 4 is a cross-sectional view of the system of FIG. 1 with the stopper and the drill bit shown in the respective retracted positions.
Figure 5:
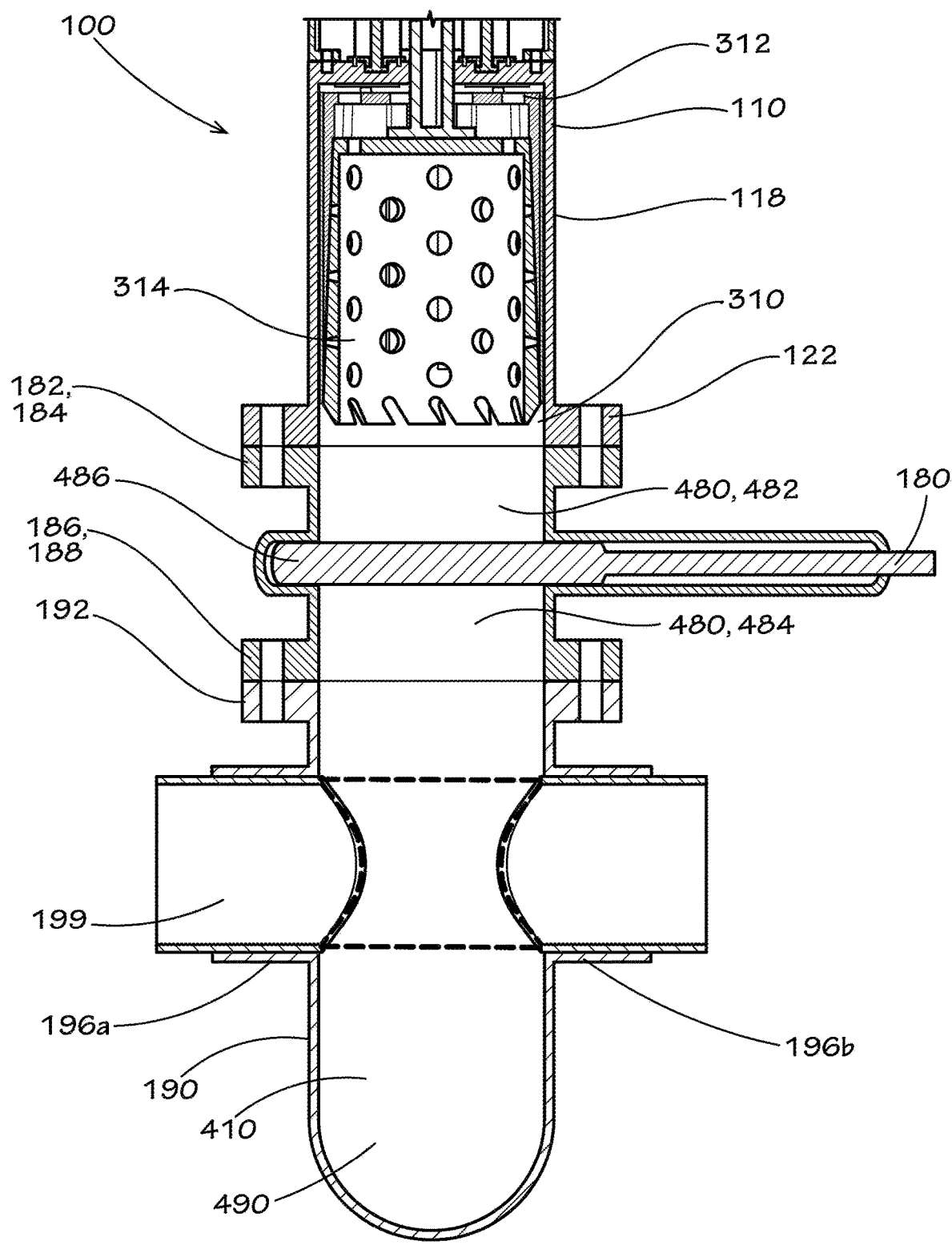
FIG. 5 is a detailed cross-sectional view of the system of FIG. 1 showing the tool housing of the machine, the valve, the fitting, and the pipeline with the stopper and the drill bit in the respective retracted positions.

FIGS. 4 and 5 are cross-sectional views showing a preliminary setup of the system 100 for drilling and stopping the pipeline 199. First, the fitting 190 can be positioned on the pipeline 199 while the pipeline 199 is intact. For example, the fitting 190 can be a typical two-piece fitting that can be assembled around the pipeline 199, such as by clamping the fitting 190 around the pipeline for example and without limitation. Here, the pipeline 199 is illustrated as being intact with the portions to be cut shown in broken lines. The fitting 190 can seal around the pipeline 199, such as through engagement between the sleeves 196a,b and the pipeline 199 to define a sealed fitting cavity 490 around the pipeline 199.

With the fitting 190 secured and sealed around the pipeline 199, the valve 180 can be coupled to the fitting, such as by fastening, or otherwise coupling, the second flange 186 to the flange 192 of the fitting 190. The flange 122 of the machine 110 can be coupled to the valve 180, such as by fastening with a plurality of fasteners, or otherwise coupling, the flange 122 of the machine 110 to the first flange 182 of the valve 180. The order should not be viewed as limiting. For example and without limitation, the valve 180 can be coupled to the fitting 190 prior to coupling the machine 110 to the valve 180, or the valve 180 can be coupled to the fitting 190 after coupling the machine 110 to the valve 180. When coupling the machine 110 to the valve 180, it can be preferable to do so with the stopper 312 and the drill bit 314 withdrawn into the housing cavity 310 in their respective retracted positions.

The valve 180 can define a valve bore 480 extending through the valve from the first end 184 to the second end 188. The valve 180 can comprise a valve member 486, which can be selectively repositioned between a closed position (shown) and an open position (shown in FIG. 7). The valve bore 480 can define a first portion 482, positioned between the valve member 486 and the first end 184, and a second portion 484, positioned between the valve member 486 and the second end 188. The first portion 482 can be in communication with the housing cavity 310. The second portion 484 can be in communication with the fitting cavity 490. With the valve member 486 in the closed position, the first portion 482 can be isolated from the second portion 484. With the valve member 486 in the open position, the first portion 482 can be in communication with the second portion 484, thereby connecting the housing cavity 310, the valve bore 480, and the fitting cavity 490 in communication. The housing cavity 310, the valve bore 480, and the fitting cavity 490 can together define a system cavity 410 of the system 100.

Figure 6:
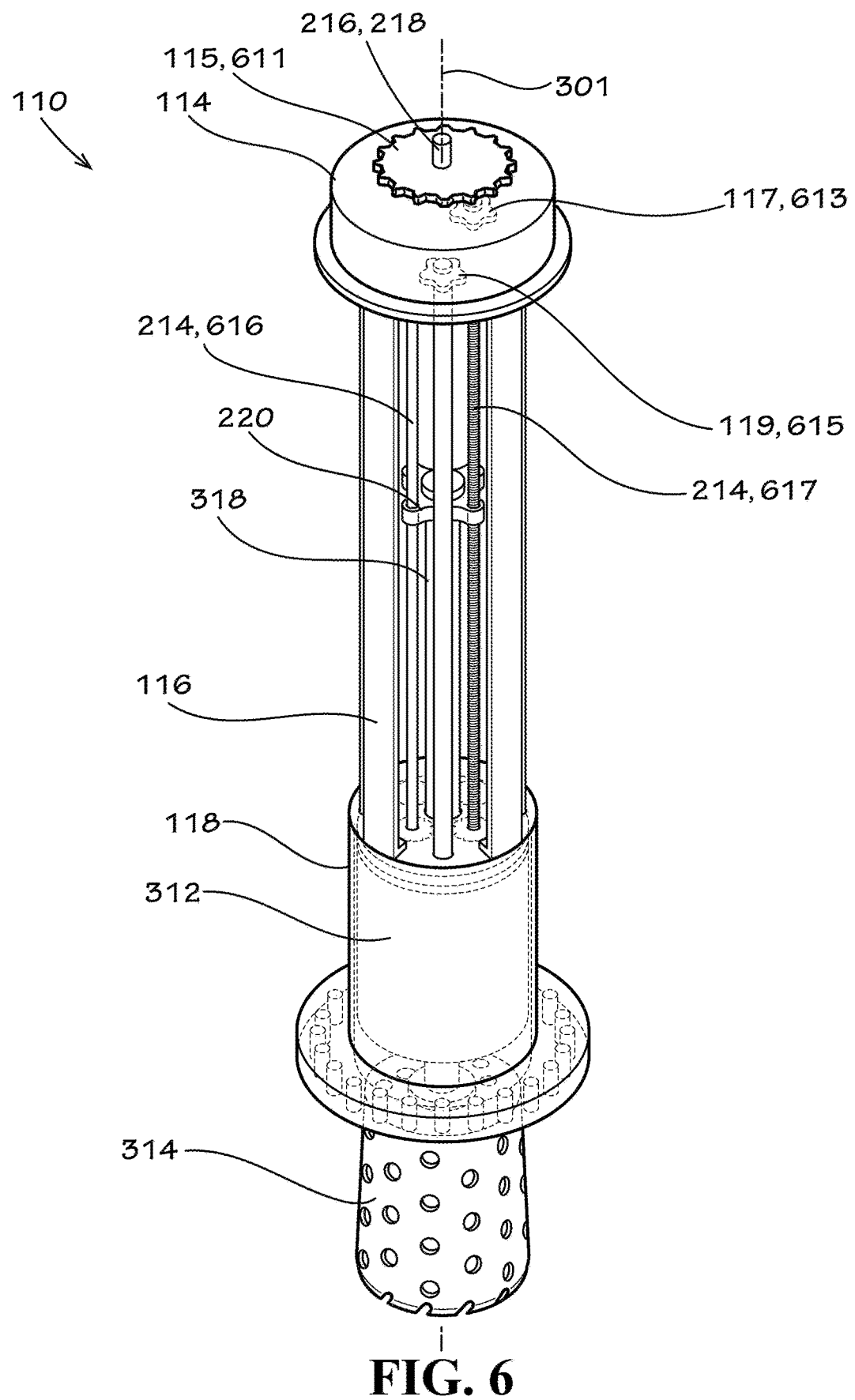
FIG. 6 is a perspective view of the machine of FIG. 1 with a body of the machine shown in transparency.

Once the system cavity 410 is intact and sealed, the valve member 486 can be placed in the open position, and the drill bit 314 can be axially advanced and rotated about the axis 301 to cut the pipeline 199, as described in greater detail with respect to FIG. 6.

FIG. 6 shows the machine 110 of FIG. 1 with the drill bit 314 partially axially translated along the axis 301 and the top housing 114 and tool housing 118 shown in transparency.

The drive mechanisms 115,117,119 of the machine 110 can transmit power to the tools 312,314. In the present aspect, each drive mechanism 115,117,119 can comprise a driven member 611,613,615, such as a gear, cog, or wheel for example and without limitation, configured to transfer power from a power source (not shown) of each respective drive mechanisms 115,117,119, such as a hydraulic, electric, pneumatic, or other type of motor for example and without limitation. For example, each driven member 611,613,615 can engage a transferring element (not shown) of the respective drive mechanisms 115,117,119, such as a chain, gear system, or belt, for example and without limitation, and the transferring element can transfer rotational force/motion from the power source to the driven member 611,613,615. In some aspects, one or more of the drive mechanisms 115, 117,119 can share a power source. For example and without limitation, the transferring element can be configured to shift power from the power source between respective driven members 611,613,615. In some aspects, multiple driven members 611,613,615 can be simultaneously powered by a shared power source. For example and without limitation, the drilling rotational drive mechanisms 115 and the linear drilling drive mechanism 117 can optionally be synchronized to simultaneously rotate and linearly advance the drill bit 314, such as under power from a shared power source. In some aspects, the drilling rotational drive mechanisms 115 and the linear drilling drive mechanism 117 can optionally be synchronized even when powered by separate power sources.

In various aspects, any or all of the driven member 611,613,615, power sources (not shown), and transferring elements (not shown) of the respective drive mechanisms 115,117,119 can be entirely or partially housed inside the top housing 114, as demonstrated by drive mechanisms 117,119. In various aspects, any or all of the driven member 611,613, 615, power sources (not shown), and transferring elements (not shown) of the respective drive mechanisms 115,117,119 can be entirely or partially housed external to the top housing 114, as demonstrated by drive mechanism 115.

Through the driven member 611, the drilling rotational drive mechanism 115 can rotate the upper drilling bar 218 of the drilling bar assembly 216, which can in turn rotate the lower drilling bar 318, each about the axis 301. As referenced above, the upper drilling bar 218 and the lower drilling bar 318 can be rotationally fixed relative to one another; however, the lower drilling bar 318 can axially translate along the axis 301 relative to the upper drilling bar 218. For example and without limitation, the lower drilling bar 318 can be rotationally fixed to the upper drilling bar 218 with a key (not shown) that can engage keyways in either or both of the upper drilling bar 218 and lower drilling bar 318, and at least one of the keyways can be elongated in an axial direction relative to the axis 301, as demonstrated in FIG. 15 by a keyway 1501 disposed within a cavity 1502 of the lower drilling bar 318. For example and without limitation, one of the drilling bars 218,318 can receive a portion of the other 218,318, such as how the cavity 1502 of FIG. 15 can receive the upper drilling bar 218. The drilling bars 218,318 can define complimentary profiles, such as teeth, splines, a non-circular or polygonal cross-sectional portion, one or more scalloped or flattened portions, or other similar "slip" engagement profile, as commonly seen in drive shafts of various types. Accordingly, the drilling rotational drive mechanism 115 can rotate the upper drilling bar 218, which in turn can rotate the lower drilling bar 318 and the drill bit 314. Rotation of the drill bit 314 by the drilling rotational drive mechanism 115 can occur independent of axial translation of the drill bit 314 along the axis 301, which can be controlled by the linear drilling drive mechanism 117.

The drilling linear drive mechanism 117 can control axial translation of the lower drilling bar 318 and the drill bit 314 along the axis 301. The lower drilling bar 318 and the drill bit 314 can be axially fixed relative to the drilling bar plate 220, and the lower drilling bar 318 and the drill bit 314 can be rotatable about the axis 301 relative to the drilling bar plate 220. The drilling bar plate 220 can be axially translatable along the axis 301, and the drilling bar plate 220 can be rotationally fixed about the axis 301.

The drilling bar plate 220 can receive or otherwise engage each of the drilling guide rods 214. In the present aspect, some of the drilling guide rods 214 can be smooth drilling guide rods 616, and some of the drilling guide rods 214 can be threaded drilling guide rods 617. In the present aspect, the machine 110 can comprise four drilling guide rods 214 with two smooth drilling guide rods 616 and two threaded drilling guide rods 617. The threaded drilling guide rods 617 can be positioned diagonally opposite from one another, on opposite sides of the drilling bar assembly 216. The threaded drilling guide rods 617 can be rotatable, while the smooth drilling guide rods 616 can be rotationally fixed or rotatable in various aspects. In some aspects, all of the drilling guide rods 214 can be threaded drilling guide rods 617.

The drilling bar plate 220 can threadedly engage each of the threaded drilling guide rods 617, and rotation of the threaded drilling guide rods 617 can axially translate the drilling bar plate 220, the lower drilling bar 318, and the drill bit 314 along the axis 301. The drilling bar plate 220 can ride along the smooth drilling guide rods 616 to further stabilize and support the drilling bar plate 220. The threaded drilling guide rods 617 can be rotated by the drilling linear drive mechanism 117. In the present view, only a single driven member 613 is shown for clarity. However, the drilling linear drive mechanism 117 can comprise a different driven member 613 rotationally fixed to each threaded drilling guide rod 617, and the transferring element (not shown), such as a belt, gear system, or chain, for example and without limitation, can extend between the different driven members 613 to synchronize rotation of the threaded drilling guide rods 617.

Figure 10:
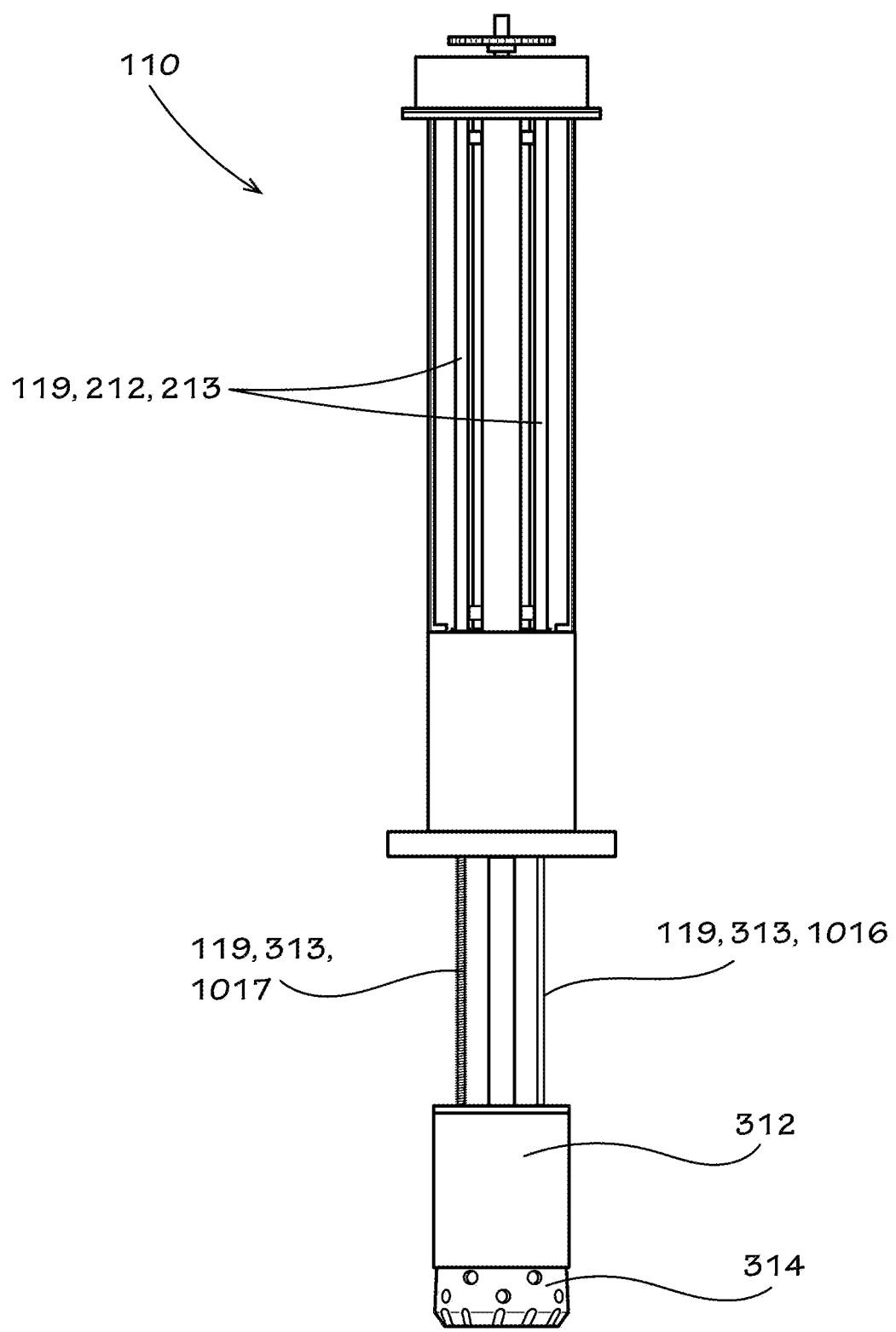
FIG. 10 is a front view of the machine of FIG. 1 with the drill bit shown in an extended position and the stopper shown in a sealing position.

The stopper linear drive mechanism 119 can control the axial translation of the stopper 312 along the axis 301. As shown in FIG. 10, some of the lower guide members 313 can be smooth lower guide members 1016, and some of the lower guide members 313 can be threaded lower guide members 1017. In the present aspect, the machine 110 can comprise four stopper guide assemblies 212 with two comprising smooth lower guide members 1016 and two comprising threaded lower guide members 1017. The threaded lower guide members 1017 can be positioned opposite from one another. In some aspects, each of the stopper guide assemblies 212 can comprise the threaded lower guide members 1017.

As noted above, for stopper guide assemblies 212 comprising threaded lower guide members 1017, the upper guide members 213 can be complimentarily threaded such that rotation of the members 213,1017 relative to one another can axially shorten or lengthen the threaded stopper guide assemblies 212. For smooth stopper guide assemblies 212, the smooth lower guide members 1016 can telescope out from the respective upper guide members 213, with or without rotating in various aspects.

Returning to FIG. 6, the stopper linear drive mechanism 119 can rotate the upper guide members 213 of those stopper guide assemblies 212 comprising threaded lower guide members 1017 to control the axial translation of the stopper 312. In the present view, only a single driven member 615 is shown for clarity; however, the upper guide member 213 of each threaded stopper guide assembly 212 can be rotationally fixed to a different driven member 615, and the transferring element (not shown), such as a belt, gear system, or chain for example and without limitation, can extend between the different driven members 615 to synchronize rotation of the upper guide member 213 of each threaded stopper guide assembly 212.

Figure 7:
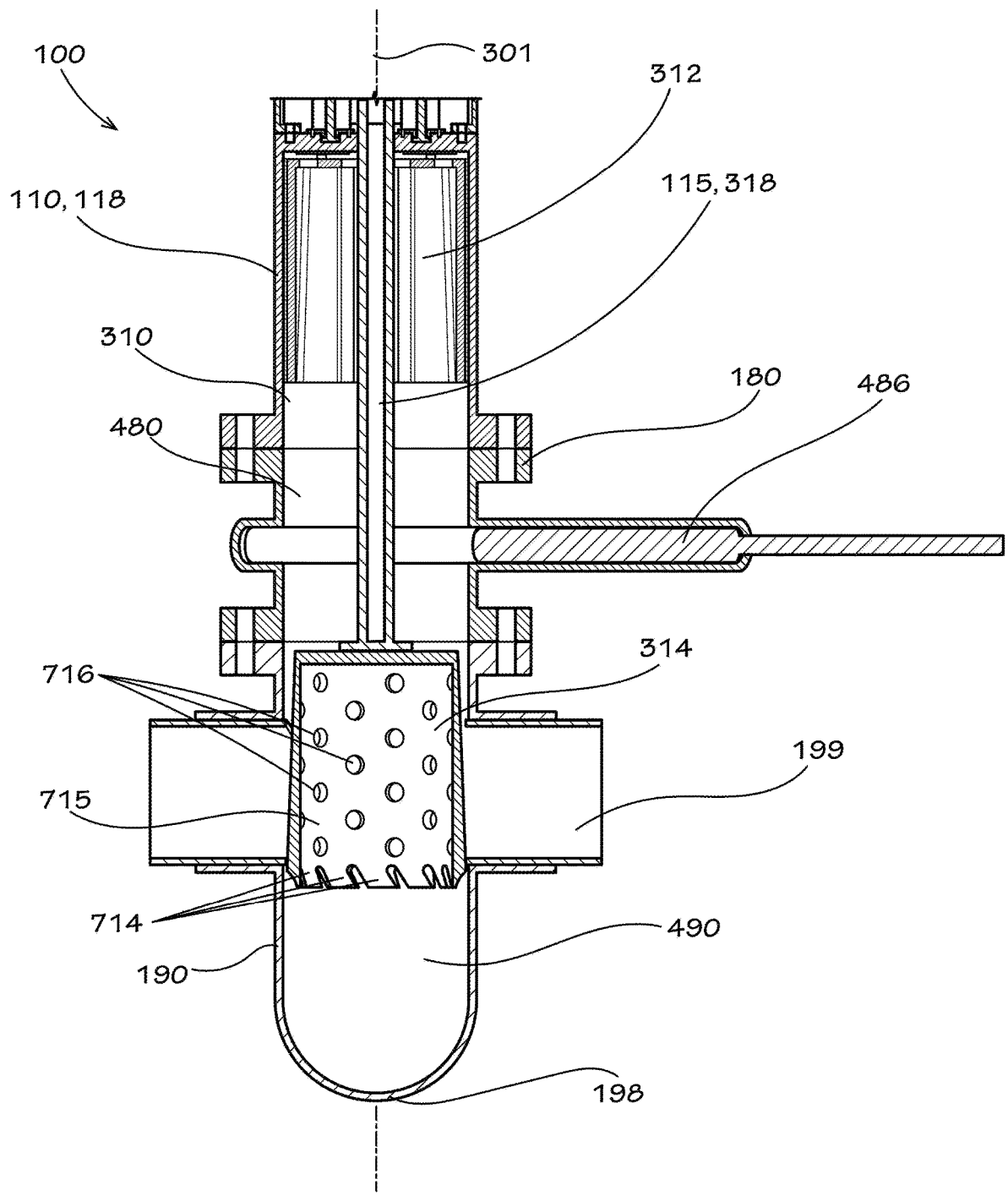
FIG. 7 is a detailed cross-sectional view of the system of FIG. 1 showing the tool housing of the machine, the valve, the fitting, and the pipeline with the drill bit engaging the pipeline.

FIG. 7 is a cross-sectional view of the system 100 of FIG. 1 demonstrating a process for drilling the pipeline 199 with the drill bit 314.

First, the valve member 486 of the valve 180 can be placed in the open position. Next, the drilling linear drive mechanism 117 (shown in FIG. 6) can axially advance the lower drilling bar 318 and the drill bit 314 along the axis 301 towards the pipeline 199. The drill bit 314 can define one or more cutting appurtenances, such as a plurality of teeth 714 positioned opposite from the lower drilling bar 318. Either before or after contacting the drill bit 314 with the pipeline 199, the drilling rotational drive mechanism 115 can begin to rotate the drill bit 314. With the drill bit 314 rotating, the drilling linear drive mechanism 117 can axially advance the drill bit 314 until it passes through the pipeline 199, thereby completing the cut. In some aspects, the pipeline 199 can be completely cut in two, or severed. In some aspects, the pipeline 199 can remain connected by strips of material along the sides (not shown).

In some aspects, a portion cut from the pipeline 199, sometimes called a "coupon," can be retained in the drill bit 314 so that it can later be extracted once the machine 110 is removed from the valve 180. In other aspects, the coupon can fall into the trap 198.

The drill bit 314 can define a plurality of holes 716, which can permit a fluid carried in the pipeline 199 to pass into and through a bit cavity 715 defined within the drill bit 314, thereby preventing flow through the pipeline 199 from being completely halted during the drilling operation. This can also prevent excess pressure from building up on one side of the drill bit 314, which could cause the drill bit 314 to bind or deflect from the axis 301 during the drilling operation.

Figure 8:
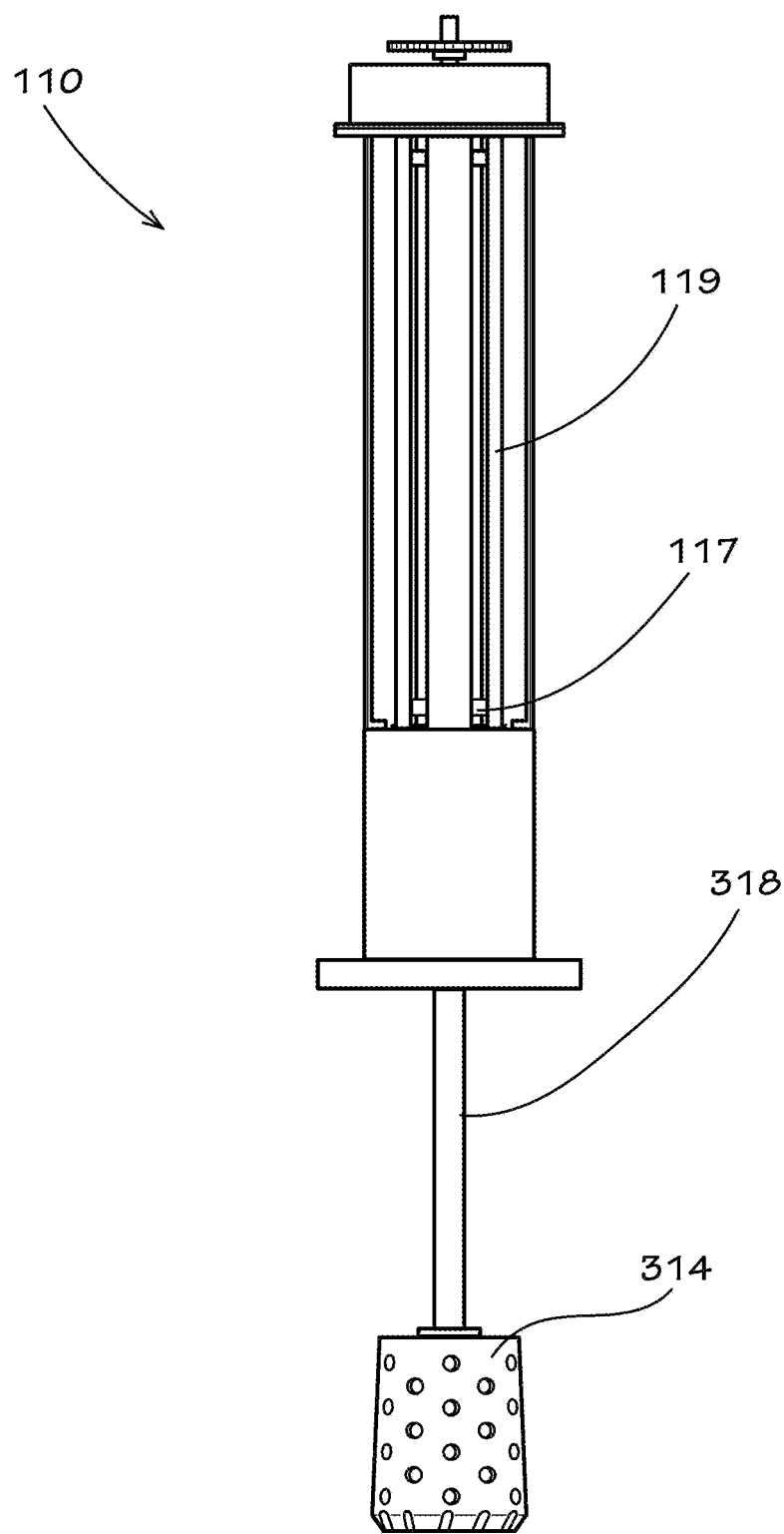
FIG. 8 is a front view of the machine of FIG. 1 with the drill bit shown in an extended position.
Figure 9:
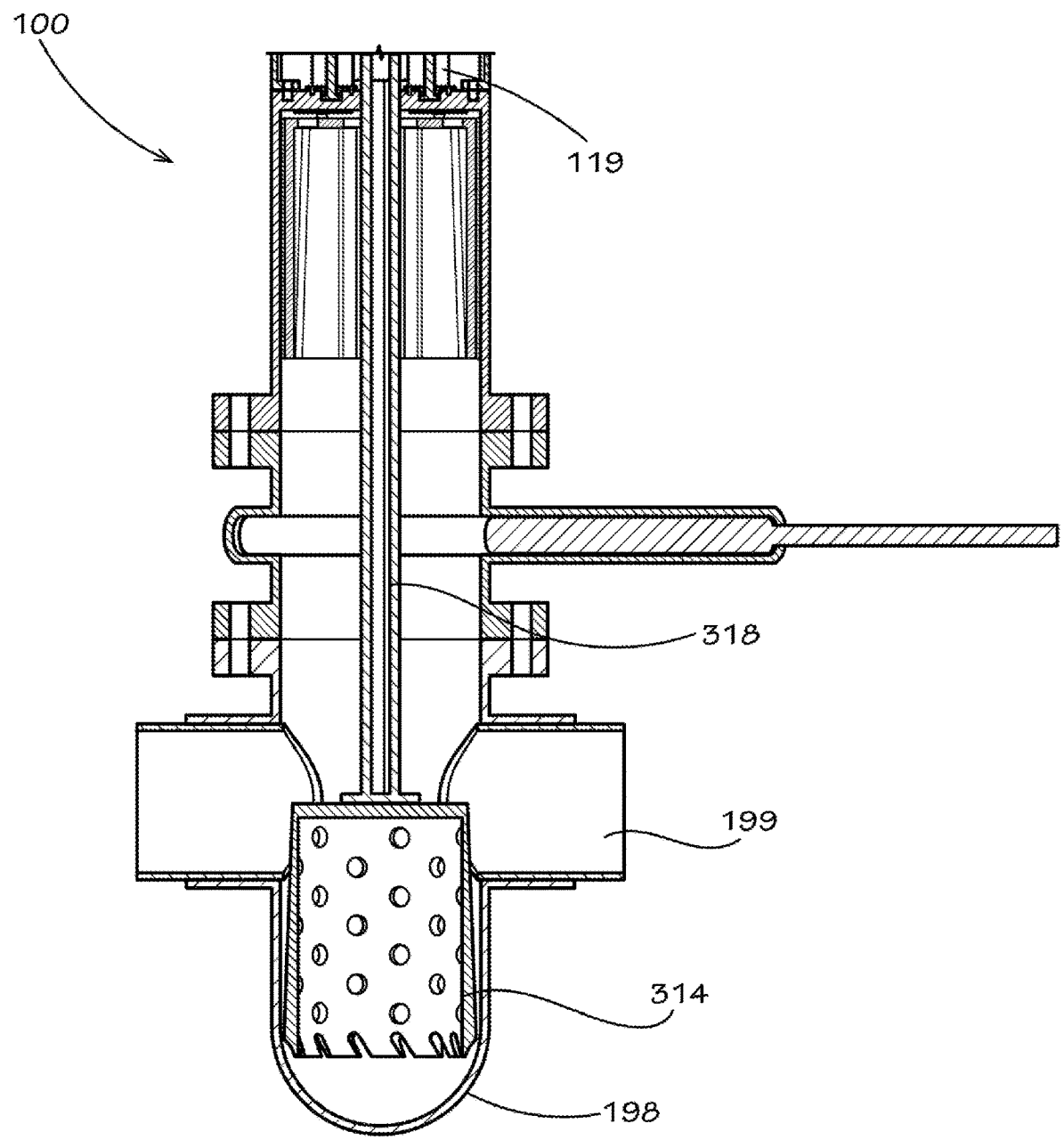
FIG. 9 is a detailed cross-sectional view of the system of FIG. 1 showing the tool housing of the machine, the valve, the fitting, and the pipeline with the drill bit in the extended position and the stopper in the retracted position.

Once the cut is complete, the drilling linear drive mechanism 117 (shown in FIG. 8) can position the drill bit 314 in a fully extended positioned, wherein the drill bit 314 can be at least partially positioned within the trap 198, and the drill bit 314 can be positioned at least partially below the pipeline 199, as shown in FIGS. 8 and 9.

Figure 11:
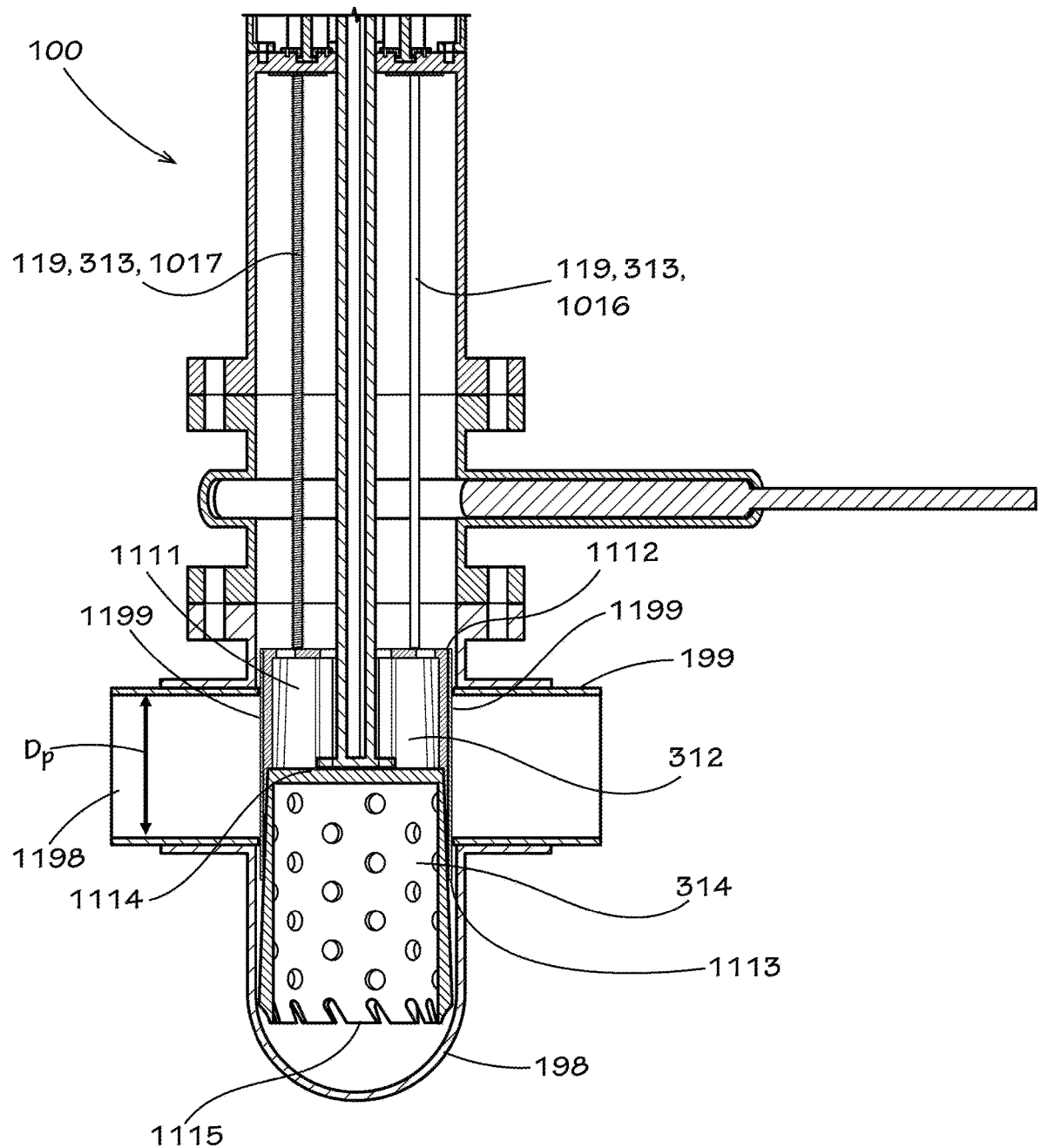
FIG. 11 is a detailed cross-sectional view of the system of FIG. 1 showing the tool housing of the machine, the valve, the fitting, and the pipeline with the drill bit in the extended position and the stopper in the sealing position.
Figure 12:
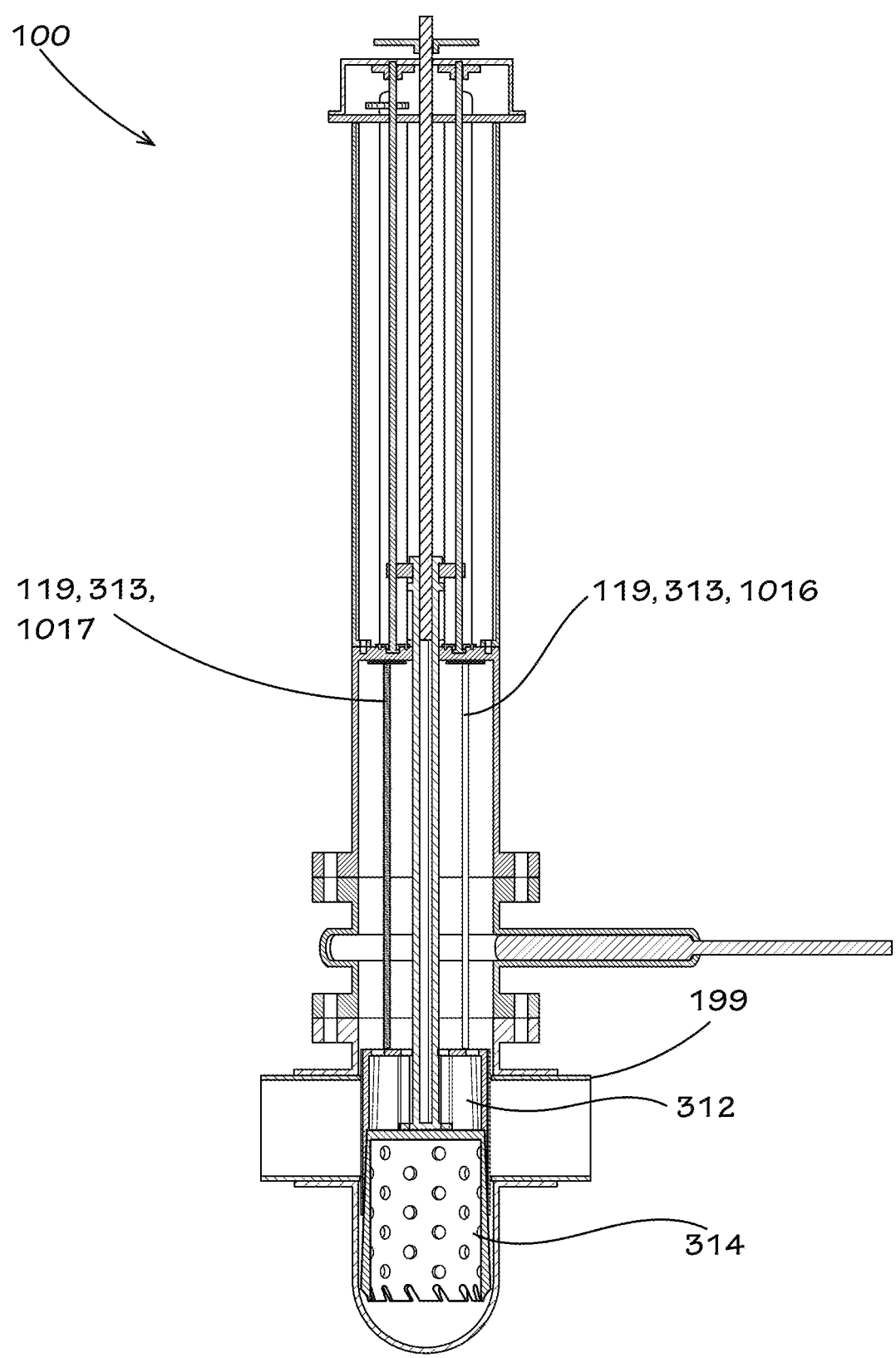
FIG. 12 is a cross-sectional view of the system of FIG. 1 with the drill bit shown in the extended position and the stopper shown in the sealing position.

With the drill bit 314 in the extended position, the stopper linear drive mechanism 119 can axially reposition the stopper 312 from the retracted position, shown in FIGS. 3-5 and 7, to a sealing position of the stopper 312, as demonstrated by FIGS. 10-12.

Turning to FIG. 11, in the sealing position of the stopper 312, the stopper 312 can be positioned between the ends 1199 of the pipeline 199. Specifically, a top end 1112 of the stopper 312 can be positioned even with or above the pipeline 199, and a bottom end 1113 can be positioned even with or below the pipeline 199 so that the stopper 312 can fully overlap at least an internal diameter $D_p$ of a bore 1198 of the pipeline 199.

In some aspects, the drill bit 314 can be at least partially nested within the stopper 312 when the drill bit 314 is in the extended position and the stopper 312 is in the sealing position. In the present aspect, with the drill bit 314 in the extended position and the stopper 312 positioned in the sealing position, a top end 1114 of the drill bit 314 can be positioned within a stopper cavity 1111 of the stopper 312 while a bottom end 1115 of the drill bit 314 can extend into the trap 198. In some aspects, the drill bit 314 may not be at least partially nested within the stopper 312 when the drill bit 314 is in the extended position and the stopper 312 is in the sealing position.

FIGS. 13-20 demonstrate how the stopper 312 can form a seal with the pipeline 199.

Figure 13:
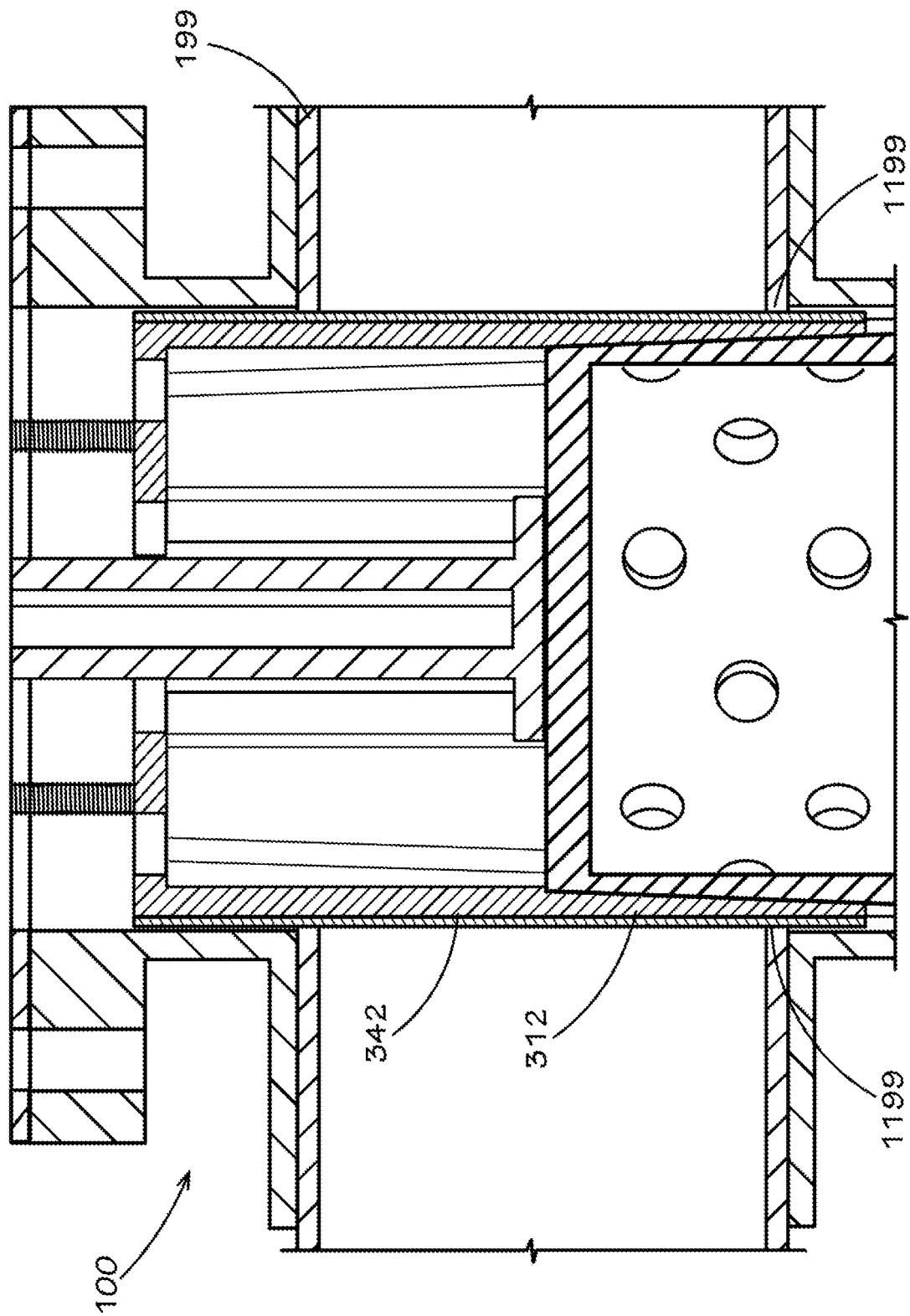
FIG. 13 is a detailed cross-sectional view of the system of FIG. 1 showing the stopper in the sealing position contacting the ends of the pipeline and the drill bit in the extended position.

As shown in FIG. 13, with the stopper 312 in the sealing position and the drill bit 314 in the extending position, gaps, or spaces, can exist between the stopper shell 342 of the stopper 312 and the ends 1199 of the pipeline 199.

Figure 14:
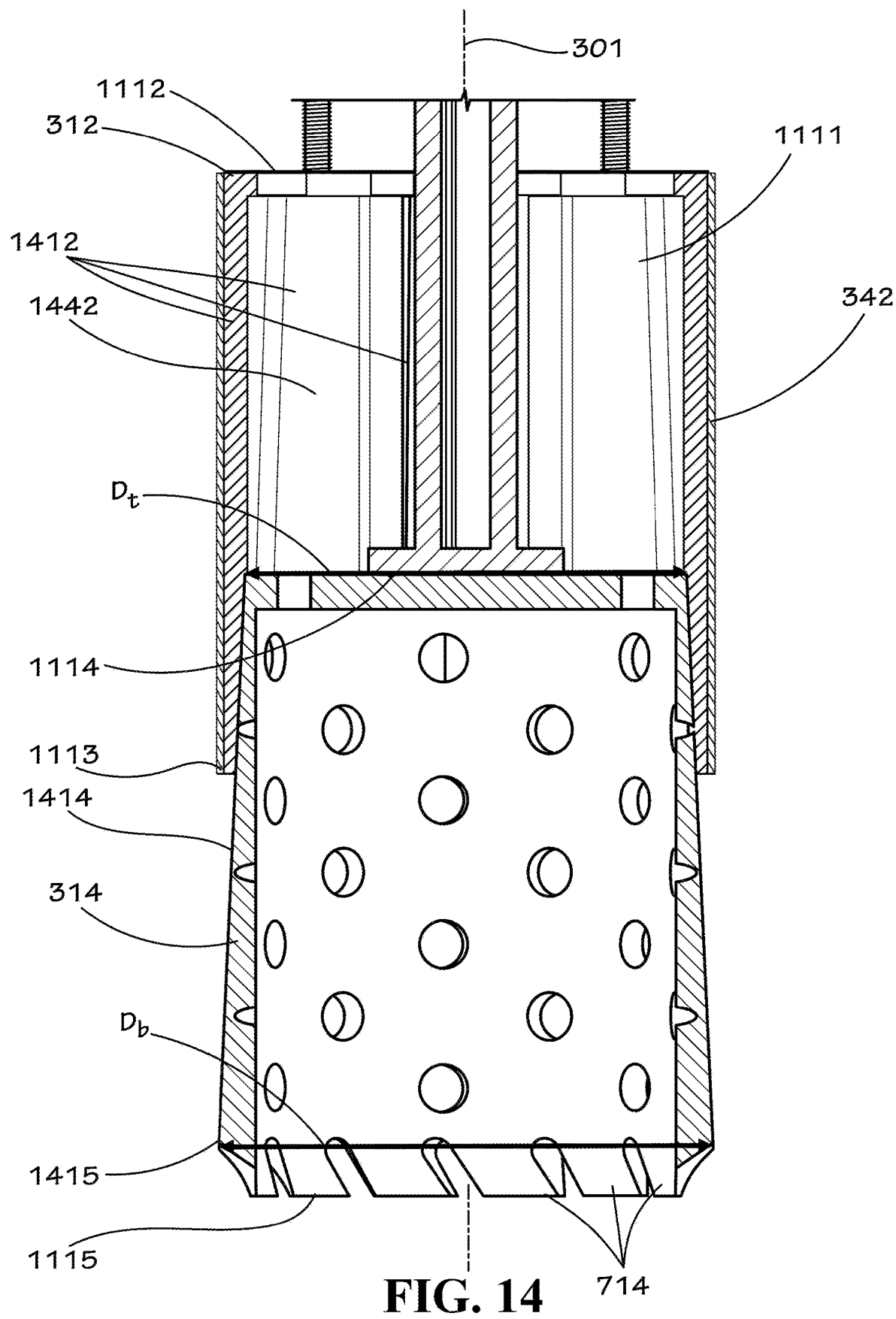
FIG. 14 is a detailed cross-sectional view of the stopper and the drill bit of the machine of FIG. 1, with the stopper shown in the sealing position and the drill bit shown in the extended position.

Turning to FIG. 14, the drill bit 314 can define a frustoconical portion 1414. The frustoconical portion 1414 can extend from the top end 1114 downwards towards the bottom end 1115. In the present aspect, the frustoconical portion 1414 can terminate above the teeth 714, which can taper inwards from the frustoconical portion 1414. The top end 1114 of the drill bit 314 can define a top diameter $D_t$, and a bottom end 1415 of the frustoconical portion 1414 can define a bottom diameter $D_b$. The bottom diameter $D_b$ can be larger than the top diameter $D_t$.

The stopper 312 can comprise a plurality of wedges 1412 positioned within the stopper cavity 1111 and attached to an inner surface 1442 of the stopper shell 342. Each wedge 1412 can taper downwards, such that each wedge 1412 can be thickest near the top end 1112 of the stopper 312 and thinnest near the bottom end 1113 of the stopper 312, when thickness is measured in a radial direction relative to the axis 301. In the present aspect, a taper of the frustoconical portion 1414 from the bottom end 1415 to the top end 1114 can be complimentary to the taper of the wedges 1412.

Figure 15:
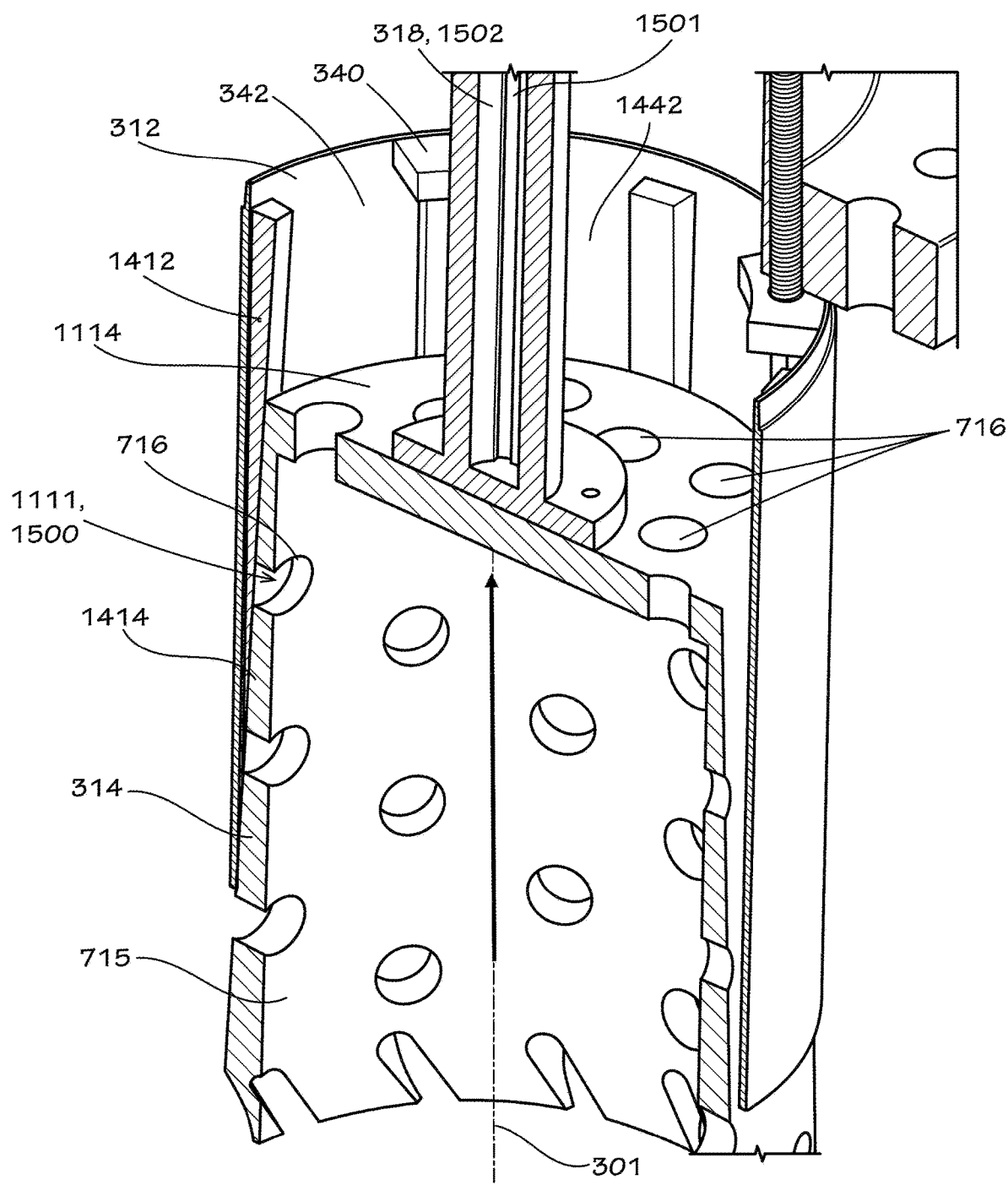
FIG. 15 is a perspective cross-sectional view of the stopper and the drill bit of the machine of FIG. 1, with the stopper shown in the sealing position and the drill bit shown transitioning from the extended position to a sealing position of the drill bit.
Figure 16:
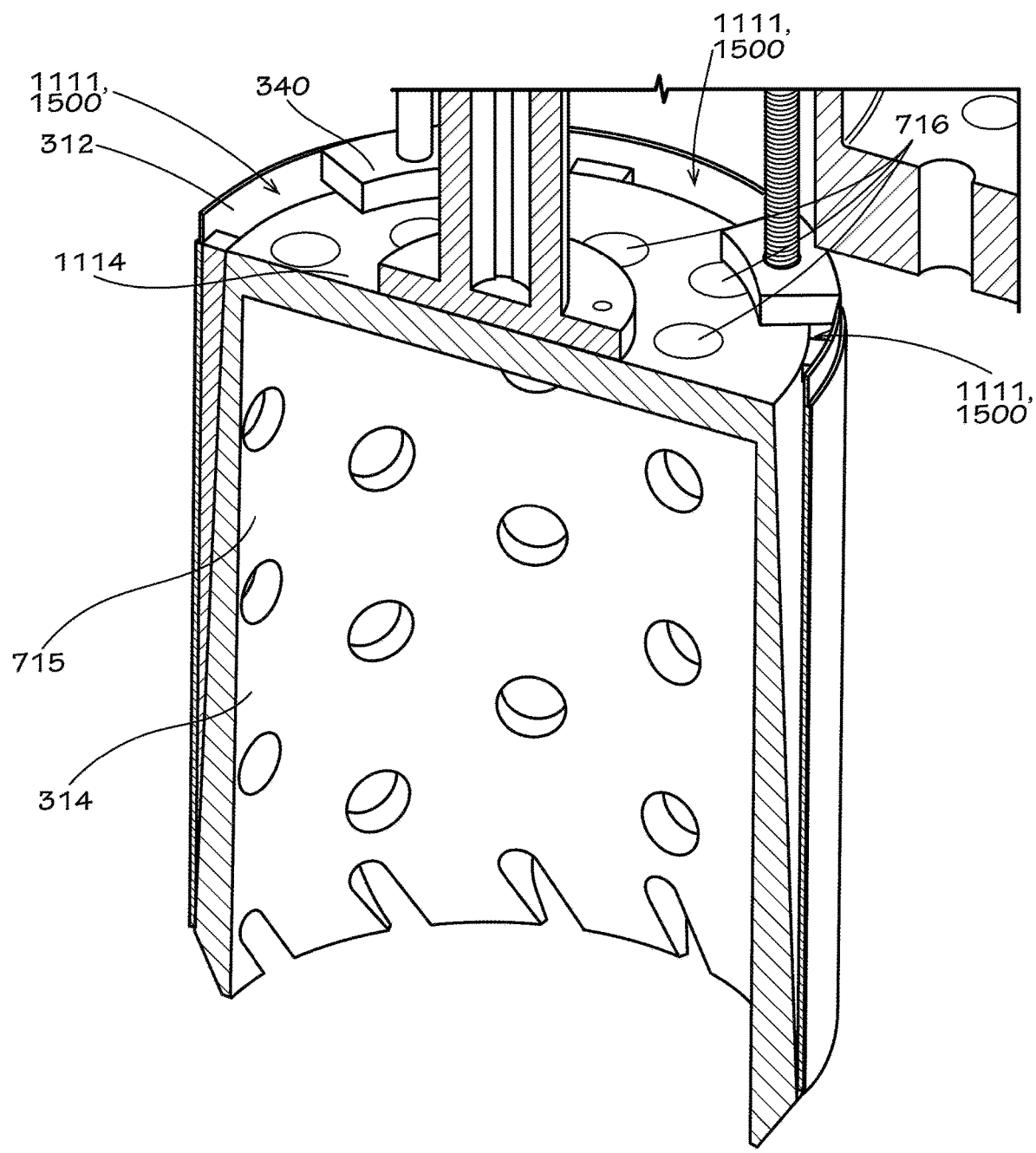
FIG. 16 is a perspective cross-sectional view of the stopper and the drill bit of the machine of FIG. 1, with the stopper and the drill bit shown in their respective sealing positions.

As shown in FIG. 15, with the stopper 312 maintained in the sealing position, the drill bit 314 can be driven axially upward along the axis 301, as represented by the directional arrow, by the drilling linear drive mechanism 117 (shown in FIG. 6). The tapered engagement between the wedges 1412 and the frustoconical portion 1414 can circumferentially and radially expand the stopper shell 342 about the axis 301. In some aspects, the wedges 1412 can comprise a bearing material, such as bronze or brass or any other suitable material, to facilitate sliding between the wedges 1412 and the frustoconical portion 1414, for example and without limitation. The drilling linear drive mechanism 117 can translate the drill bit 314 upwards until the drill bit 314 is in a sealing position of the drill bit 314, as shown in FIGS. 16-20. In some aspects, the top end 1114 can contact the stopper frame 340 to positively control the position of the drill bit 314 relative to the stopper 312 when both are positioned in their respective sealing positions, as shown in FIG. 16. In some aspects, both the stopper 312 and drill bit 314 can be simultaneously moved to expand the stopper 312, such as by driving the stopper 312 and the drill bit 314 in opposite axial directions, for example and without limitation.

Additionally, because the wedges 1412 can act as stand-offs to space the inner surface 1442 of the stopper shell 342 apart from the drill bit 314, an annular portion 1500 of the stopper cavity 1111 can be defined between the stopper shell 342 and the drill bit 314, as seen through the hole 716 in the drill bit 314 in FIG. 15 and gaps between the stopper shell 342 and the top end 1114, as shown in FIG. 16. Also shown in FIGS. 15 and 16, the top end 1114 can define holes 716 extending through the drill bit 314 to the bit cavity 715. Any fluids entering the stopper cavity 1111 and the bit cavity 715 can pass upwards through the drill bit 314 and stopper 312, as further discussed with respect to FIG. 17.

Figure 17:
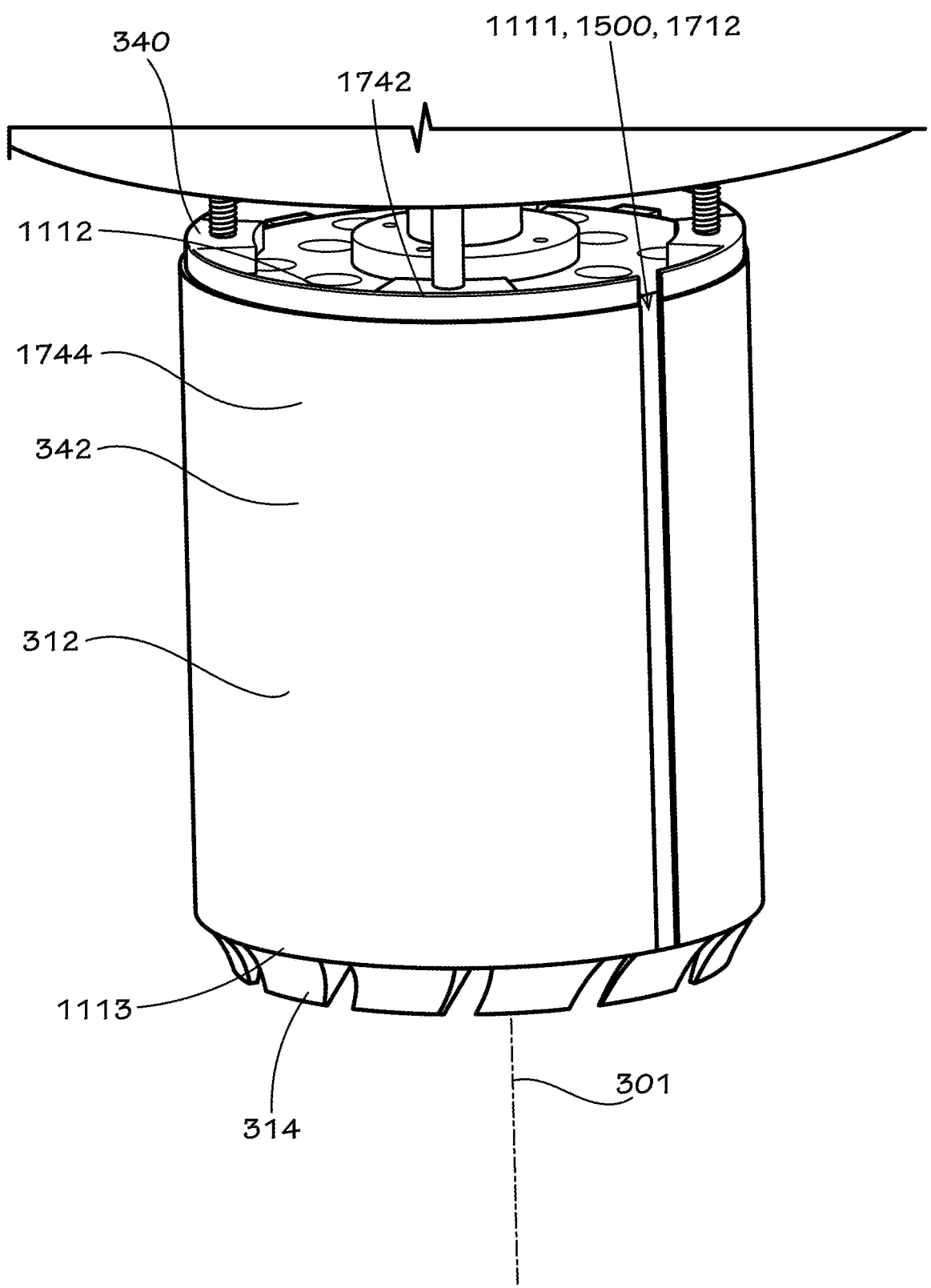
FIG. 17 is a perspective view of the stopper and the drill bit of the machine of FIG. 1, with the stopper and the drill bit shown in their respective sealing positions.

As shown in FIG. 17, the stopper shell 342 can define a gap 1712 in its circumference. The gap 1712 can optionally extend parallel to the axis 301 from the top end 1112 to the bottom end 1113. In some aspects, the gap 1712 may only extend partially between the top end 1112 and the bottom end 1113. In some aspects, the gap 1712 may not be parallel to the axis 301. In some aspects, the stopper shell 342 can define multiple gaps 1712. In the present aspect, the stopper shell 342 can comprise a flexible and resilient material, and the stopper shell 342 can be provided with a limited range of movement relative to the stopper frame 340, which can balance support provided to the stopper shell 342 by the stopper frame 340 with the ability of the stopper shell 342 to circumferentially and radially expand when the drill bit 314 is translated into its sealing position, as described above.

In the present aspect, the stopper shell 342 can comprise an inner layer 1742 and an outer layer 1744. The inner layer 1742 can offer flexible support for the outer layer 1744, while the outer layer 1744 can be configured to resiliently deform, such as for forming a seal with the ends 1199 (shown in FIG. 20) of the pipeline 199 (shown in FIG. 20), as discussed in greater detail below with respect to FIG. 20. For example and without limitation, the inner layer 1742 can comprise sheet metal, a rigid plastic, composite, or any other suitable material, and the outer layer 1744 can comprise rubber, a soft plastic, or any other suitable material. In other aspects, the stopper shell 342 can comprise a single layer, comprised of either a single or multiple materials. For example and without limitation, the stopper shell 342 can comprise a composite construction, such as a reinforced elastomer, for example and without limitation.

The gap 1712 can also facilitate the circumferential and/or radial expansion of the stopper shell 342. Because of the gap 1712, circumferential tension within the stopper shell 342, commonly referred to as hoop stress, can be avoided or minimized as the stopper shell 342 circumferentially expands. In other aspects, the stopper shell 342 may not define the gap 1712. In such aspects, the stopper shell 342 can comprise one or more resilient materials capable of circumferential and/or radial expansion. Such expansion can be purely elastic expansion, plastic expansion, or a combination thereof.

In the present aspect, the gap 1712 can provide an opening to the annular portion 1500 of the stopper cavity 1111, which can facilitate the flow of fluids through the stopper 312 and the drill bit 314, if desired.

Figure 18:
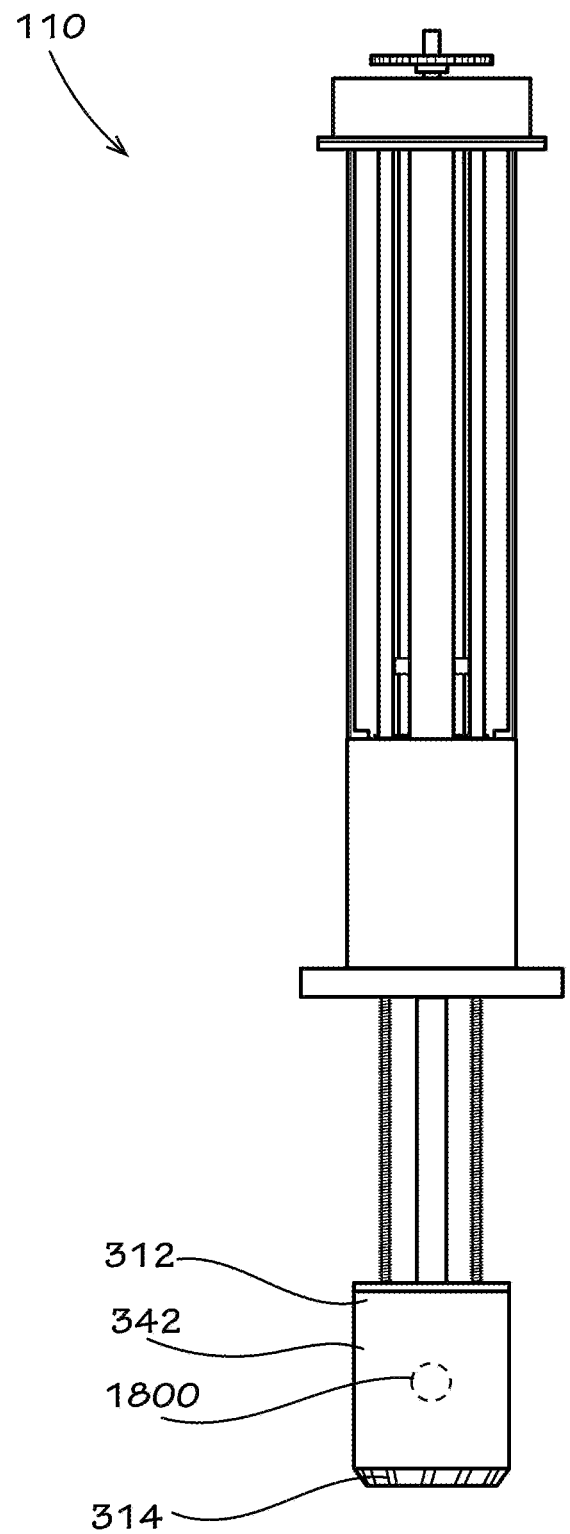
FIG. 18 is a front view of the machine of FIG. 1, with the stopper and the drill bit shown in their respective sealing positions.
Figure 19:
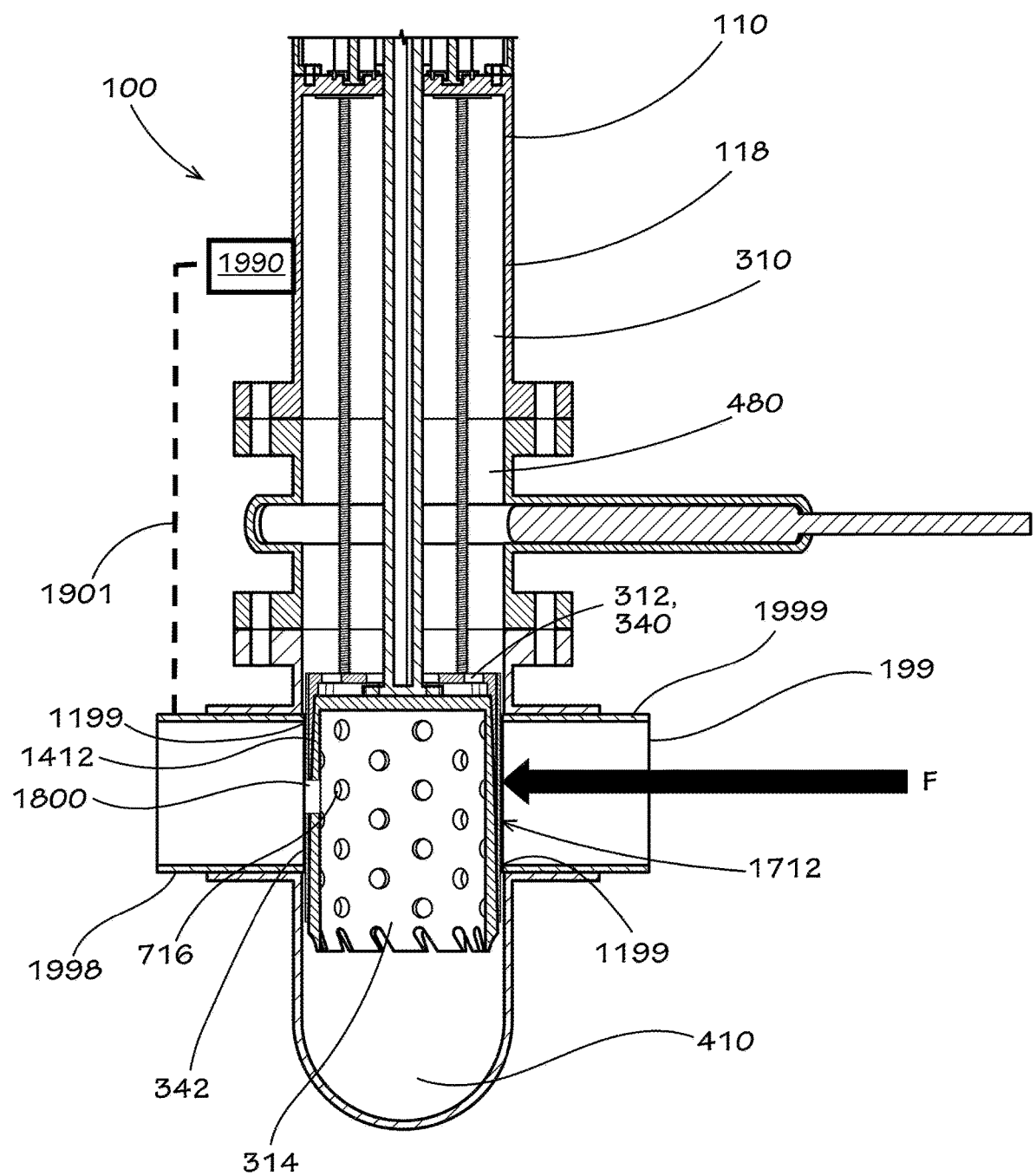
FIG. 19 is a detailed cross-sectional view of the system of FIG. 1 showing the tool housing of the machine, the valve, the fitting, and the pipeline with the stopper and the drill bit shown in their respective sealing positions between the ends of the pipeline.
Figure 20:
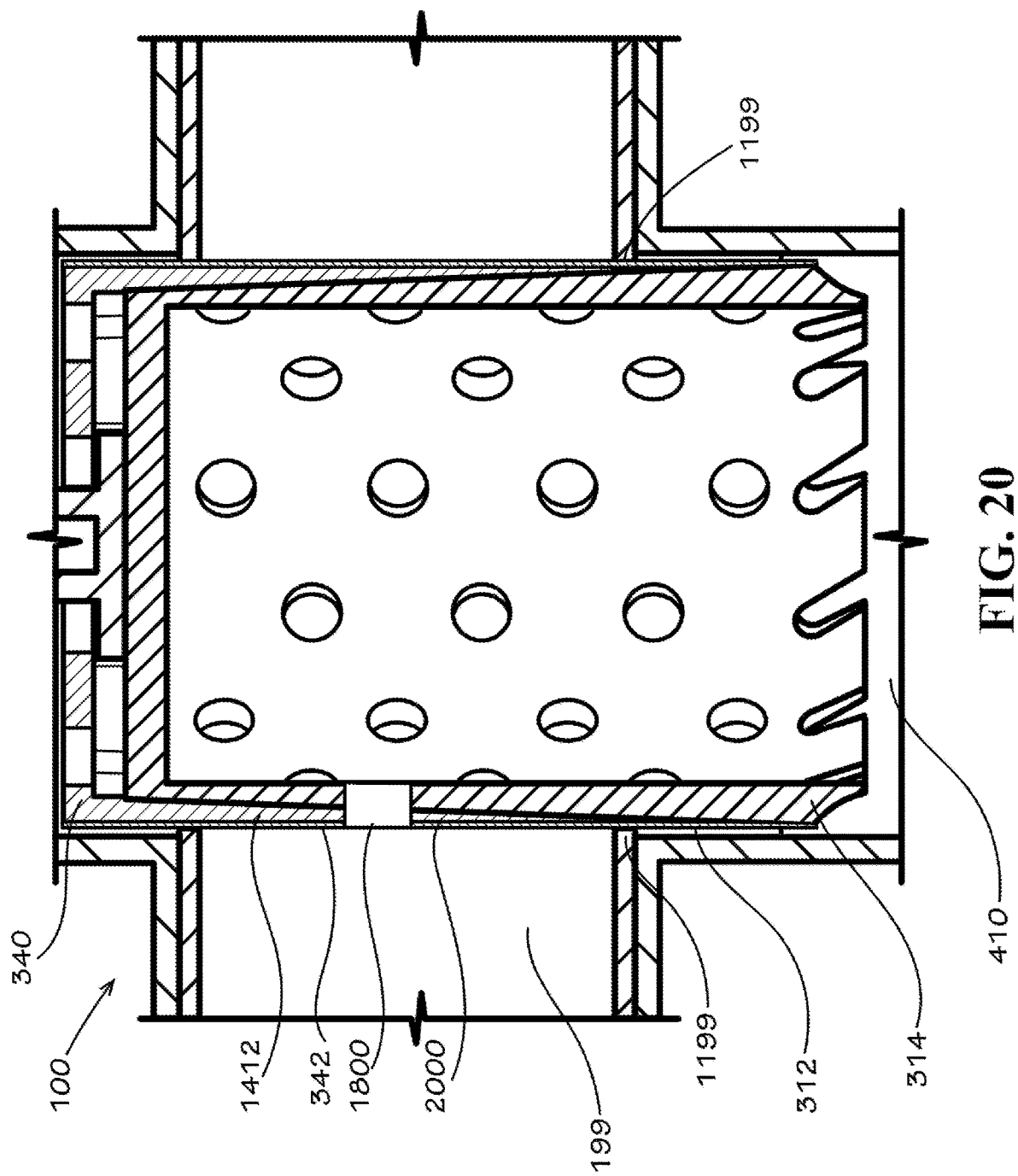
FIG. 20 is a detailed cross-sectional view of the stopper and the drill bit in their respective sealing positions between the ends of the pipeline.

FIG. 18 shows the stopper 312 and the drill bit 314 in their respective sealing positions. In some aspects, the stopper 312 can define a stopper port 1800. The stopper port 1800 can extend, or penetrate, through the stopper shell 342 and one of the wedges 1412 (shown in FIGS. 19 and 20), which can be sealed together. For example and without limitation, the penetrated wedge 1412 can be welded, bonded, fastened (with or without a gasket), or otherwise coupled to the stopper shell 342 in a manner that forms a seal at the interface between the stopper shell 342 and the wedge 1412. In other aspects, the wedges 1412 can be integrally formed with the stopper shell 342. In some aspects, the penetrated wedge 1412 can be wider than other wedges 1412 of the stopper 312. In some aspects, the stopper 312 may not comprise discrete wedges 1412, and the stopper 312 can instead define a uniformly tapered interior shaped complementary to the drill bit 314, for example and without limitation. In some aspects, the stopper port 1800 can be positioned opposite from the gap 1712. FIGS. 19 and 20 show the stopper 312 sealing with a downstream segment 1998 of the pipeline 199, and/or, an upstream segment 1999 of the pipeline 199, when the stopper 312 and the drill bit 314 are in the respective sealing positions.

After being cut by the drill bit 314, the ends 1199 of the pipeline 199 can define a notched, or coped, shape (see FIG. 21), similar to how tubular members are prepared before making a 90-degree saddle joint in structural fabrication. The stopper 312 can define a substantially cylindrical shape, and as shown in FIGS. 19 and 20, the notched shape of the ends 1199 can fit around the stopper 312. With both the stopper 312 and the drill bit 314 in their respective sealing positions, the stopper shell 342 can be pressed against each of the ends 1199.

Rotational indexing of the stopper shell 342, and the gap 1712 (shown in FIG. 19) in particular, relative to the stopper frame 340 can determine whether the stopper 312 forms a seal with the downstream segment 1998, the upstream segment 1999, or both. As demonstrated in FIG. 19, to seal only the downstream segment 1998, the gap 1712 can be aligned with the end 1199 of the upstream segment 1999, and a fluid carried by the upstream segment 1999 can flow through the stopper 312 and into the system cavity 410, including the housing cavity 310, the valve bore 480, and the fitting cavity 490 of the system cavity 410, via the gap 1712. To seal only the upstream segment 1999, the gap 1712 can be aligned with the end 1199 of the downstream segment 1998, thereby connecting the system cavity 410, including the housing cavity 310, the valve bore 480, and the fitting cavity 490 of the system cavity 410, in fluid communication with the downstream segment 1998. To seal both the downstream segment 1998 and the upstream segment 1999, the gap 1712 can be positioned between the ends 1199, such as facing out of or into the page with respect to the present viewing angle.

In some aspects, the stopper 312, or portions thereof, can be rotatable to realign the gap 1712. For example and without limitation, in some aspects, the stopper shell 342 can be rotatable on the stopper frame 340. In some aspects, the drill bit 314 can rotationally engage the stopper shell 342 and/or the stopper 312, and the drill bit 314 can be rotated to rotate the stopper shell 342 or the stopper 312 in its entirety. In some aspects, the stopper 312 can be independently rotated from the drill bit 314, such as with a separate mechanism.

In common usage, the stopper 312 can be used to seal the downstream segment 1998, thereby stopping a flow of fluids from the upstream segment 1999 from reaching the downstream segment 1998. The downstream segment 1998 can then be worked on or otherwise serviced, often after depressurizing and venting the downstream segment 1998 or where the nature of the repair, such as replacing a ruptured section of the pipeline 199 in the downstream segment 1998, results in depressurization of the downstream segment 1998. When the upstream segment 1999 is pressurized and the downstream segment 1998 is depressurized, a pressure differential between the segments 1998,1999 can exert a force F on the stopper 312 that can strengthen the seal with the end 1199 of the downstream segment 1998. This can be the case regardless of whether the stopper 312 forms a seal with both the upstream and downstream segments 1998,1999 or just the downstream segment 1998.

Once it is desired to resume flow from the upstream segment 1999 to the downstream segment 1998, generally, the downstream segment 1998 is partially or fully pressurized to reduce or eliminate the pressure differential across the stopper 312, as well as the corresponding force F. One common practice is to tap both the upstream segment 1999 and downstream segment 1998 and install a small bypass line that can permit fluids to flow around the stopper 312 until the downstream segment 1998 is adequately pressurized. However, this approach can be time consuming and usually requires adding new holes to the pipeline 199, which can potentially leak in the future.

In some aspects, the machine 110 can comprise a bypass valve 1990, which can be mounted to the tool housing 118 and can be selectively connected in fluid communication with the system cavity 410 by opening and closing the bypass valve 1990. In such aspects, a bypass line 1901 can be installed between the bypass valve 1990 and the downstream segment 1998 of the pipeline 199. In such aspects, the gap 1712 (shown in FIG. 17) can be positioned in alignment with the end 1199 of the upstream segment 1999 so that only the end 1199 of the downstream segment 1998 is sealed. With this arrangement, fluids can flow from the upstream segment 1999 through the stopper 312 and drill bit 314, as similarly described above with respect to FIGS. 15-17, upwards through the valve bore 480 and housing cavity 310, and through the bypass valve 1990 and bypass line 1901 to the downstream segment 1998 in order to bring the downstream segment 1998 up to pressure. By doing so, it can be unnecessary to tap the upstream segment 1999 for a bypass line, thereby saving time and reducing potential leak points in the pipeline 199.

In some aspects wherein the stopper 312 defines the stopper port 1800, sealing and pressure equalization can involve translation and/or rotation of the drill bit 314. For example, when sealing the downstream segment 1998, the gap 1712 can be aligned with the upstream segment 1999, and the stopper port 1800 can be aligned with the downstream segment 1998. When the stopper 312 is in the sealing position and the drill bit 314 is in the extended position, the fluid can flow from the upstream segment 1999 through the gap 1712 and then through the stopper port 1800 to the downstream segment 1998. Once the drill bit 314 is retracted into the stopper 312 to position the drill bit in the sealing position of the drill bit 314, the drill bit 314 can be rotationally oriented to seal the stopper port 1800 in a first rotational orientation. For example and without limitation, a solid portion of the drill bit 314 can cover and seal with the stopper port 1800 to prevent flow through the stopper port 1800 with the drill bit 314 in the first rotational orientation, thereby stopping flow to the downstream segment 1998. In some aspects, the stopper 312 can comprise a seal 2000, such as an O-ring, (shown in FIG. 20) positioned around the stopper port 1800 to facilitate sealing with the drill bit 314. For example and without limitation the seal 2000 can be bonded to the stopper shell 342 or wedge 1412, and in some aspects, the stopper 312 can define a groove for receiving the seal 2000. Once the work on the downstream segment 1998 has been completed, the drill bit 314 can be rotated relative to the stopper 312 to a second rotational orientation, wherein one of the holes 716 of the plurality of holes in the drill bit 314 can be aligned with the stopper port 1800.

In some aspects, the drill bit 314 can be axially translated, in addition to or in place of rotation, to selectively open and seal the stopper port 1800, such as by axially repositioning the drill bit 314 to align and misalign the holes 716 relative to the stopper port 1800. For example and without limitation, the holes 716 can be positioned so that when both the drill bit 314 and the stopper 312 are in their respective sealing positions, none of the holes 716 align with the stopper port 1800 (i.e. the holes 716 can be axially positioned above and/or below the stopper port 1800 when both the stopper 312 and the drill bit 314 are in their respective sealing positions). Some of the holes 716 can be positioned, such as above the stopper port 1800, so that when the drill bit 314 is translated downwards towards the extended position while the stopper 312 remains in its sealing position, one of the holes 716 can align with the stopper port 1800. Once one of the holes 716 and the stopper port 1800 are aligned, the fluid can flow from the upstream segment 1999 through the gap 1712 and then through the stopper port 1800 to the downstream segment 1998 until the pressure differential between segments 1998,1999 has been adequately reduced or eliminated, thereby eliminating the need for a bypass line.

Figure 21:
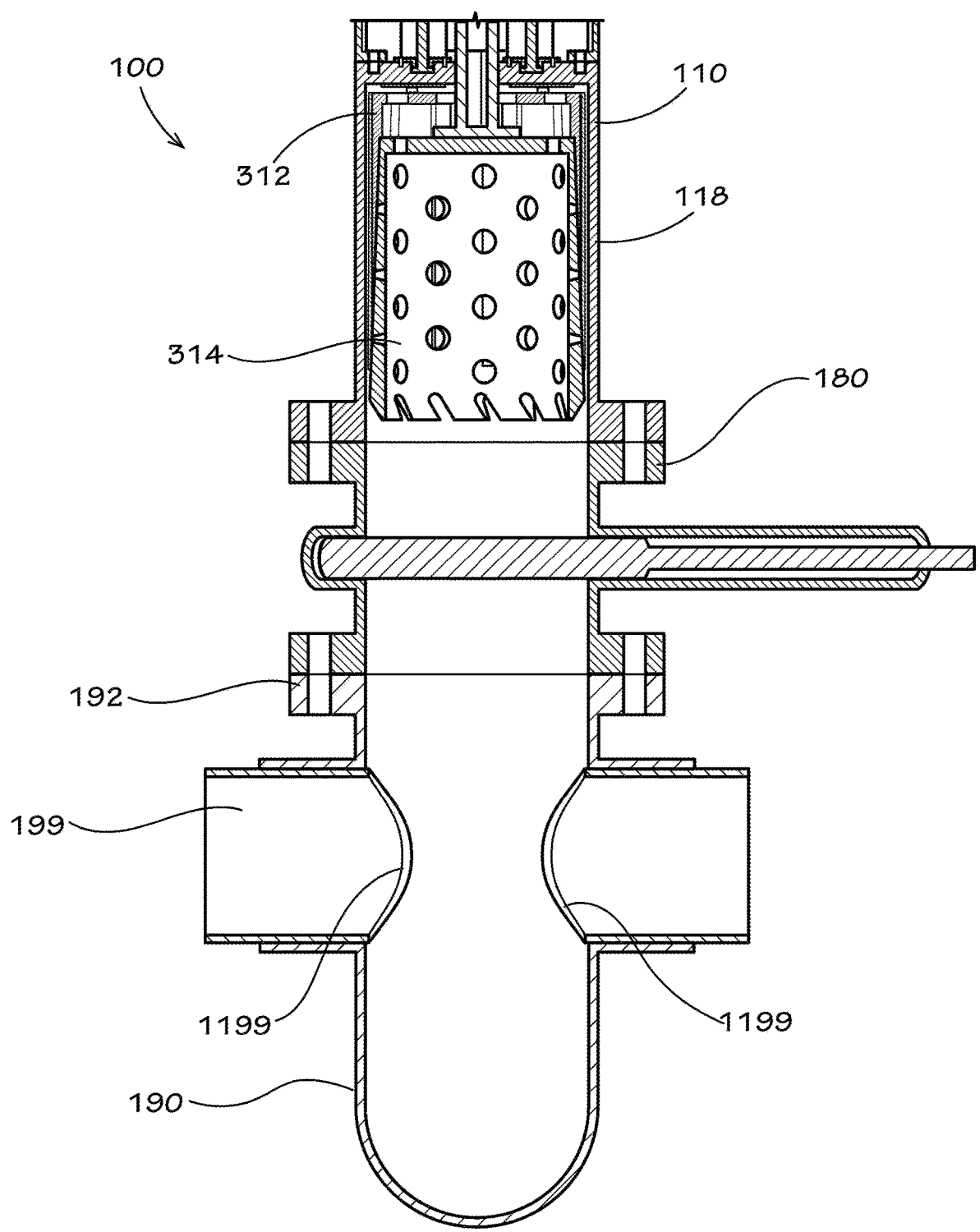
FIG. 21 is a detailed cross-sectional view of the system of FIG. 1 showing the tool housing of the machine, the valve, the fitting, and the pipeline with the stopper and the drill bit shown returned to their respective retracted positions.

Once the pressure differential between segments 1998, 1999 has been adequately reduced or eliminated, the drill bit 314 can be returned to the extended position, as shown in FIGS. 8 and 9, thereby disengaging the stopper 312 from the ends 1199. The stopper 312 can then be withdrawn to its retracted position, as shown in FIGS. 7 and 9, and the drill bit 314 can then be withdrawn to its retracted position, as shown in FIG. 21, which depicts both the stopper 312 and the drill bit 314 returned to their respective retracted positions within the tool housing 118 of the machine 110. Once the stopper 312 and the drill bit 314 are positioned in their respective retracted positions, the valve 180 can be closed as shown. With the valve 180 closed, the machine 110 can be removed and replaced by a completion machine (not shown), which can install a plug (not shown) in the flange 192 of the fitting 190. Alternatively, in some aspects, the same machine 110 can be used to install the plug and complete the installation, such as by replacing the drill bit 314 with a tool for installing the plug. In such aspects, the single machine 110 can perform drilling, stopping, and completing operations.

Figure 22:
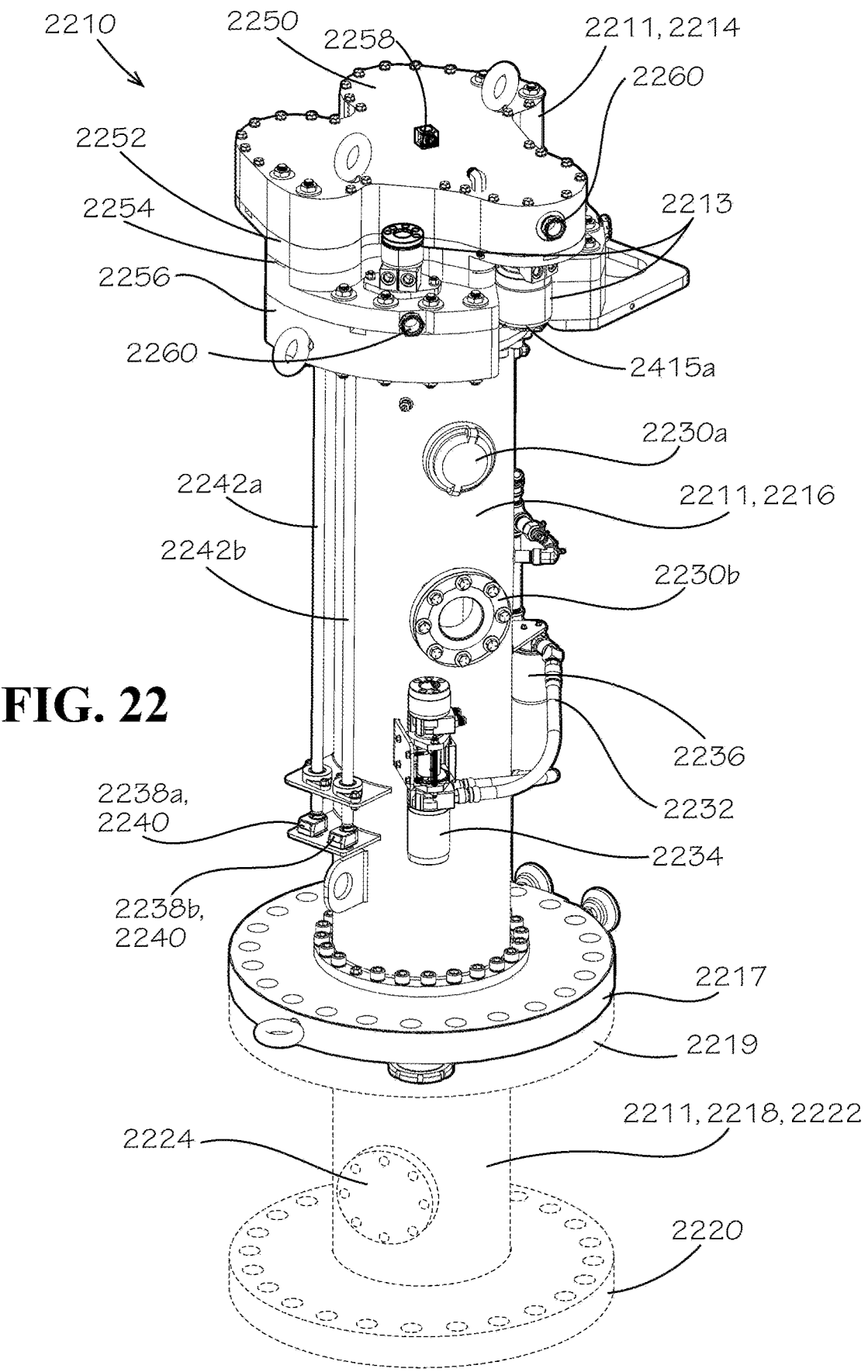
FIG. 22 is a front perspective view of another aspect of the machine in accordance with another aspect of the present disclosure.

FIGS. 22-29 provide various views of another aspect of a combined drilling and stopping machine 2210 (referred to hereafter as "the machine 2210") in accordance with another aspect of the present disclosure. The machine 2210 can be utilized with any of the components of the system 100 of FIG. 1, such as the valve 180, the fitting 190, the pipeline 199, the stopper 312, and/or the drill bit 314 (the valve 180, the fitting 190, and the pipeline 199 shown in FIG. 1; the stopper 312 and the drill bit 314 shown in FIG. 3). FIG. 22 is a front perspective view of the machine 2210.

The machine 2210 can comprise a body 2211 and a plurality of drive mechanisms 2213 (shown and discussed below with respect to FIGS. 23-29). The body 2211 can comprise a top housing 2214, a tube 2216 (also referred to as a "main housing"), and a tool housing 2218 (shown in broken lines). The top housing 2214 and the tool housing 2218 can be coupled to opposite ends of the tube 2216.

Various portions of the drive mechanisms 2213 can be mounted to and/or enclosed by the top housing 2214, the tube 2216, and the tool housing 2218.

The tube 2216 can comprise a bottom flange 2217, which can be coupled to a top flange 2219 of the tool housing 2218. The tool housing 2218 can further comprise a bottom flange 2220, and a tubular portion 2222 extending between the two flanges 2219,2220. In some aspects, the tubular portion 2222 can comprise one or more nipples 2224. The tool housing 2218 can define a housing cavity, similar to the housing cavity 310 (shown in FIG. 3), which can be configured for housing one or more tools, such as the stopper 312,3212 (stopper 312 shown in FIG. 3; stopper 3212 shown in FIG. 32) and the drill bit 314,3014 (drill bit 314 shown in FIG. 3; drill bit 3014 shown in FIG. 30).

The tube 2216 can comprise one or more nipples 2230a,b. The nipple 2230a can be equipped with an openable fitting configured to provide access to a tube cavity 2300 (shown in FIG. 23) at least partially defined within the tube 2216. The nipple 2230b can be equipped with a lens to provide a viewing window into the tube cavity 2300.

The machine 2210 can also comprise a lubrication system 2232 mounted to the tube 2216. The lubrication system 2232 can comprise a pump 2234 and a filter 2236. The lubrication system 2232 can be configured to circulate a lubricant through the tube cavity 2300 to lubricate portions of the various drive mechanisms 2213.

The machine 2210 can further comprise one or more counters 2238a,b. The counters 2238a,b can track the position of one or more of the drive mechanisms 2213, as discussed below in greater detail. In the present aspect, the counters 2238a,b can be mechanical counters with a visual display 2240. In some aspects, the counters 2238a,b can be electrical counters, which may or may not have a visual display 2240. In aspects lacking the visual displays 2240, a signal can be transmitted to a remote display, such as that of a control panel, computer, phone, tablet, or other suitable device. A pair of counter shafts 2242a,b can respectively extend from the counters 2238a,b to the top housing 2214, where each shaft 2242a,b can engage with a different one of the drive mechanisms 2213.

The top housing 2214 can comprise a top cover 2250, a first housing plate 2252, a second housing plate 2254, and a third housing plate 2256. The top housing 2214 can comprise one or more lubrication fittings 2258. The lubrication fittings 2258 can be configured to supply lubricant to one or more of the drive mechanisms 2213. The top housing 2214 can also comprise one or more sight glasses 2260, which can provide views into the top housing 2214.

Figure 23:
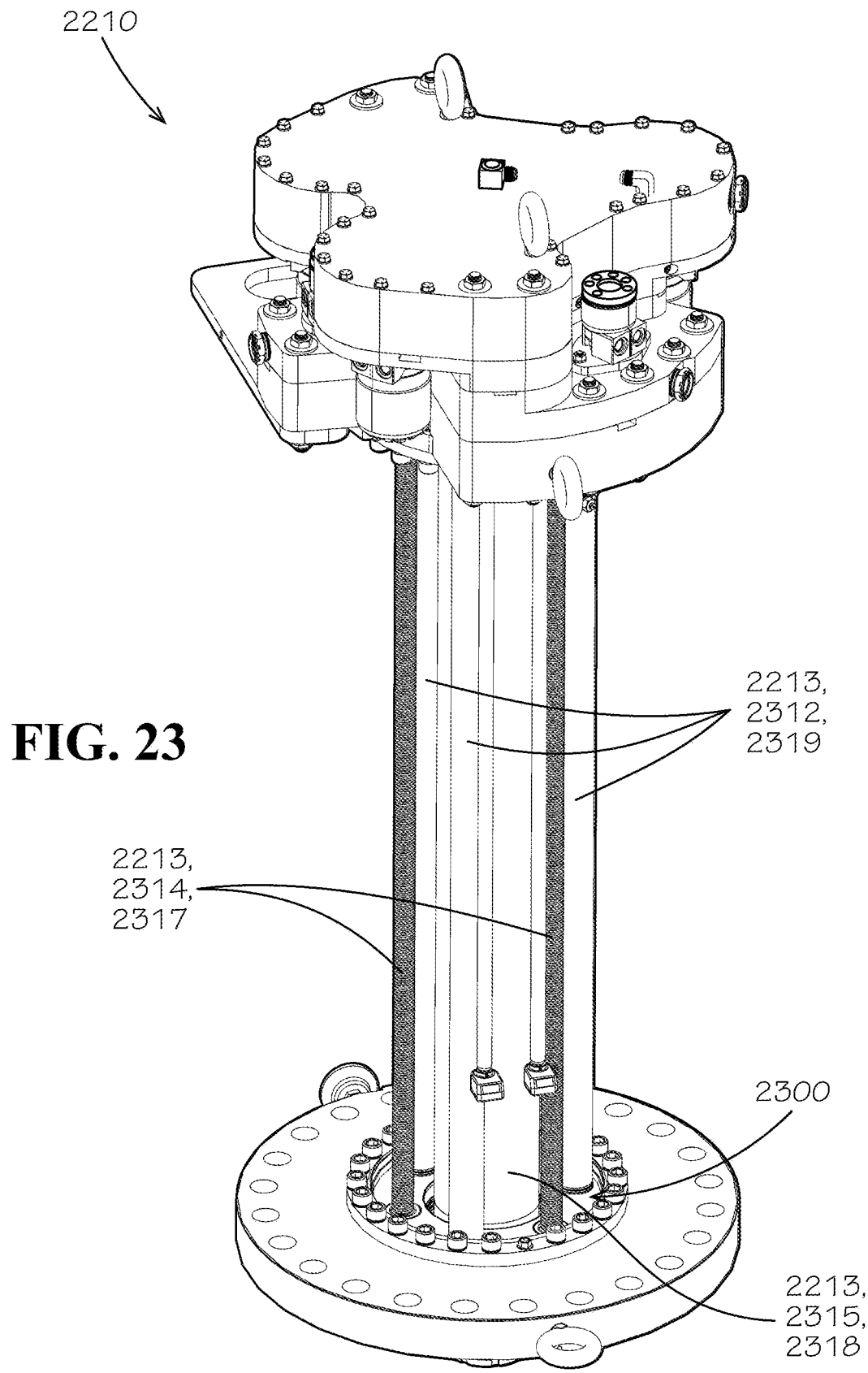
FIG. 23 is a side perspective view of the machine of FIG. 22, shown with a tube of the machine partially hidden from view.

FIG. 23 is a side perspective view of the machine 2210 of FIG. 22. The machine 2210 is shown with a portion of the tube 2216 (shown in FIG. 22), the lubrication system 2232 (shown in FIG. 22), and the tool housing 2218 (shown in FIG. 22) hidden from view. As shown, the tube cavity 2300 is exposed.

The machine 2210 can comprise a plurality of stopper guide assemblies 2312, a plurality of drilling guide rods 2314, and a drilling bar assembly 2318, each extending through the tube cavity 2300. In the present aspect, the machine 2210 can comprise three stopper guide assemblies 2312; however, the machine 2210 can have greater or fewer than three stopper guide assemblies 2312 in some aspects. In the present aspect, the machine 2210 can comprise three drilling guide rods 2314; however, the machine 2210 can have greater or fewer than three drilling guide rods 2314 in some aspects. The stopper guide assemblies 2312 and the drilling bar assembly 2318 can each be configured to telescope, as discussed below in greater detail with respect to FIGS. 27-29. The drilling guide rods 2314 can control the telescoping of the drilling bar assembly 2318. For example and without limitation, the drilling guide rods 2314 can be Acme screws.

The plurality of drive mechanisms 2213 can comprise a drilling rotational drive mechanism 2315, a drilling linear drive mechanism 2317, and a stopper linear drive mechanism 2319. The drilling rotational drive mechanism 2315 can comprise the drilling bar assembly 2318. The drilling linear drive mechanism 2317 can comprise the drilling guide rods 2314. The stopper linear drive mechanism 2319 can comprise the stopper guide assemblies 2312.

Figure 24:
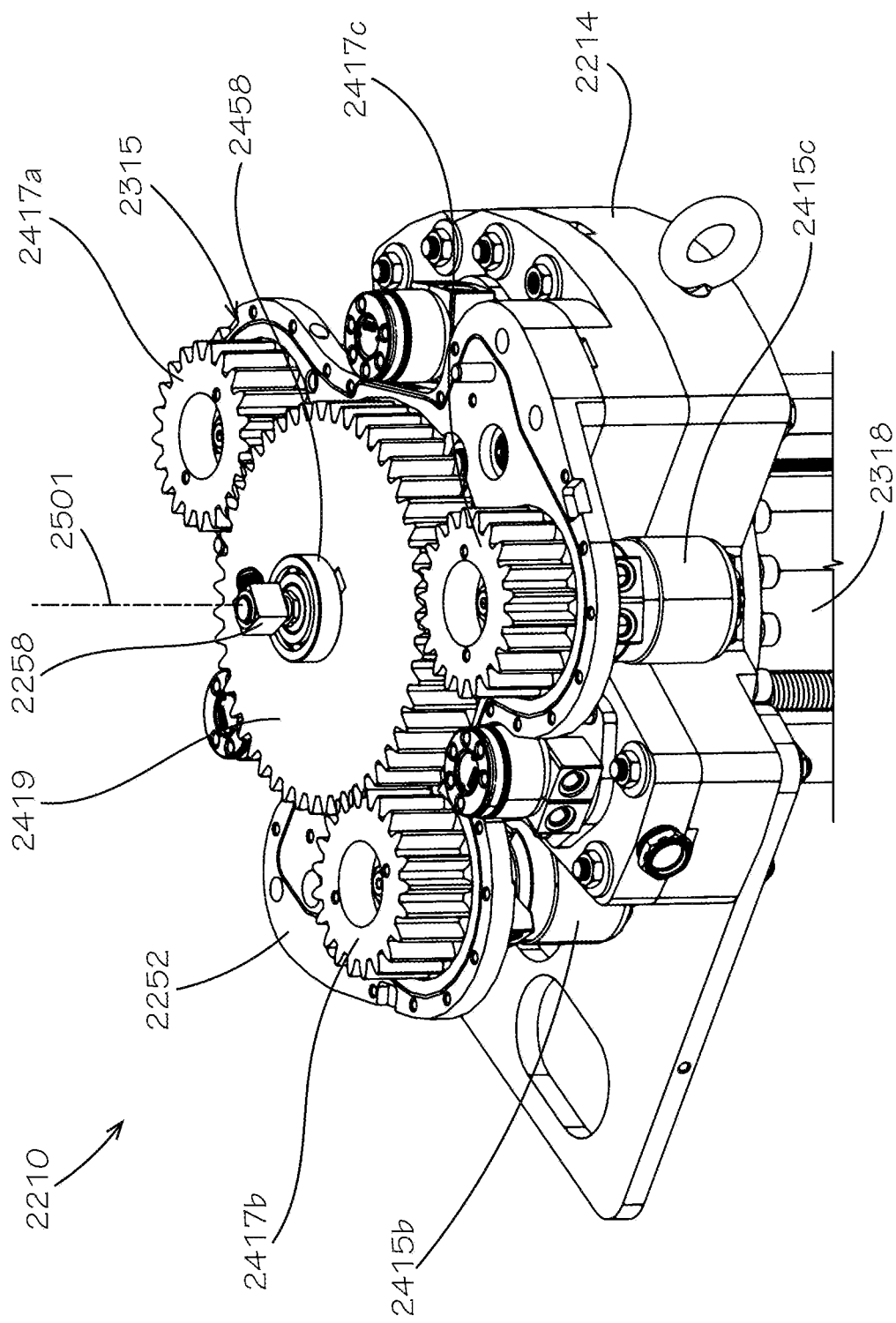
FIG. 24 is a detail view of a drilling rotational drive mechanism of the machine of FIG. 22.

FIG. 24 is a detail view of the drilling rotational drive mechanism 2315 of the machine 2210 of FIG. 22. The top housing 2214 is shown with the top cover 2250 (shown in FIG. 22) removed. The drilling rotational drive mechanism 2135 can comprise a plurality of motors 2415a,b,c, (motor 2415a shown in FIG. 22), a plurality of motor drive gears 2417a,b,c, and a drilling bar driven gear 2419. The motors 2415a,b,c can be hydraulic, electric, pneumatic, or any other type of motor, for example and without limitation. In some aspects, the drilling rotational drive mechanism 2135 can comprise greater or fewer than three drive motors 2415 and/or motor drive gears 2417. In some aspects, the drilling bar driven gear 2419 can be directly coupled with a drive motor 2415, which can be hydraulic, electric, pneumatic, or any other type of motor, for example and without limitation. In some aspects, a drive motor 2415 can be directly coupled to the drilling bar assembly 2318.

The motors 2415a,b,c, can be mounted to the first housing plate 2252. The gears 2417a,b,c,2419 can be positioned between the first housing plate 2252 and the top cover 2250 when the machine 2210 is fully assembled with the top cover 2250 in place.

Each motor drive gear 2417a,b,c can be coupled to and rotated by one of the motors 2415a,b,c, respectively. The motor drive gears 2417a,b,c can each engage, or mesh, with the drilling bar driven gear 2419. In some aspects, power can be transferred from the motors 2415a,b,c to the drilling bar driven gear 2419 with one or more transferring elements, such as a chain, gear system, or belt, for example and without limitation.

The drilling bar driven gear 2419 can be rotationally fixed to the drilling bar assembly 2318. When the motors 2415a,b,c are powered, the motors 2415a,b,c can cooperatively rotate the motor drive gears 2417a,b,c, which in turn can rotate the drilling bar driven gear 2419, which in turn can rotate the drilling bar assembly 2318 about an axis 2501 of the drilling bar assembly 2318. The lubrication fitting 2258 can lubricate a top bearing 2458 of the drilling rotational drive mechanism 2135.

Figure 25:
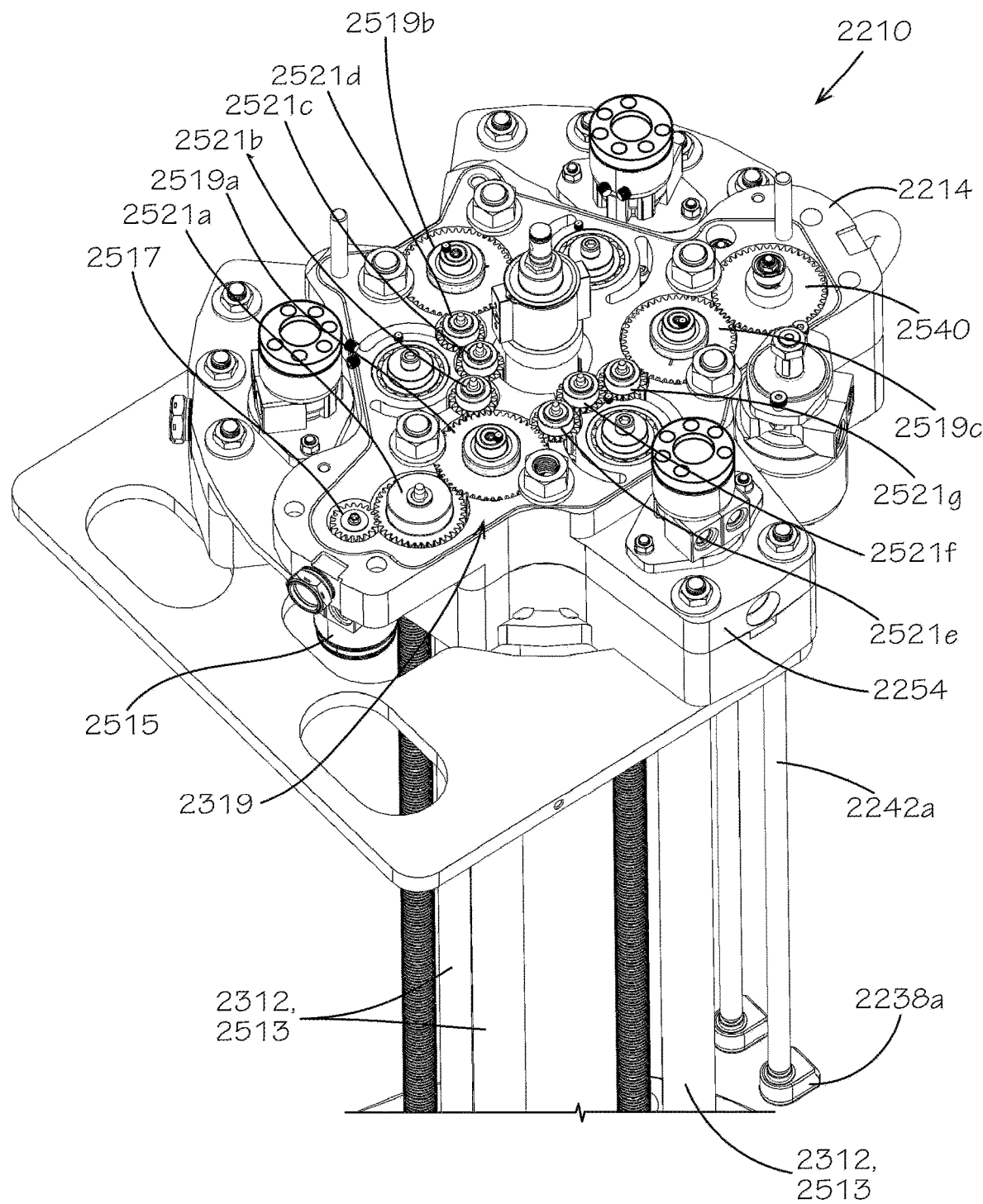
FIG. 25 is a detail view of a stopper linear drive mechanism of the machine of FIG. 22.

FIG. 25 is a detail view of the stopper linear drive mechanism 2319 of the machine 2210 of FIG. 22. The top housing 2214 is shown with the first housing plate 2252 (shown in FIG. 22), the plurality of motors 2415a,b,c (shown in FIGS. 22 and 24), the plurality of motor drive gears 2417a,b,c (shown in FIG. 24), and the drilling bar driven gear 2419 (shown in FIG. 24) further removed, amongst other removed components.

The stopper linear drive mechanism 2319 can comprise a motor 2515, a motor drive gear 2517, a plurality of stopper assembly driven gears 2519a,b,c, and a plurality of idler gears 2521a-g. The motor 2515 can be hydraulic, electric, pneumatic, or any other type of motor, for example and without limitation. The motor drive gear 2517 can be coupled to the motor 2515. The motor 2515 can be coupled to the second housing plate 2254. The gears 2517,2519a,b,c,2521a-g can be positioned between the second housing plate 2254 and the first housing plate 2252 (shown in FIG. 22) when the top housing 2214 is assembled.

The stopper assembly driven gears 2519a,b,c can be respectively coupled to the stopper guide assemblies 2312. Specifically, the stopper assembly driven gears 2519a,b,c can be rotationally fixed to an upper guide member 2513 of each respective stopper guide assembly 2312. The idler gear 2521a can mesh with both the motor drive gear 2517 and the stopper assembly driven gear 2519a, and the idler gear 2521a can transmit power from the motor drive gear 2517 to the stopper assembly driven gear 2519a. In some aspects, the stopper linear drive mechanism 2319 can utilize one or more different transferring elements in place of or in addition to one or all of the idler gears 2521a-g, such as a chain, gear system, or belt, for example and without limitation.

The stopper assembly driven gear 2519a can be synchronized with both the stopper assembly driven gears 2519b,c through the idler gears 2521b-g. For example, the idler gear 2521b can mesh with the stopper assembly driven gear 2519a, which in turn can mesh with the idler gear 2521c, which in turn can mesh with the idler gear 2521d, which in turn can mesh with the stopper assembly driven gear 2519b. The idler gears 2521e-g can similarly interconnect the stopper assembly driven gear 2519a with the stopper assembly driven gear 2519c. Accordingly, when the stopper assembly driven gear 2519a is rotated (such as by the motor 2515), the stopper assembly driven gears 2519b,c, can be synchronized with the stopper assembly driven gear 2519a, such that each upper guide member 2513 rotates together at the same speed and in the same direction.

A stopper linear counter gear 2540 can be rotationally fixed to the counter shaft 2242a, which in turn can be coupled to the counter 2238a. The stopper linear counter gear 2540 can mesh with the stopper assembly driven gear 2519c. Accordingly, when the stopper linear drive mechanism 2319 rotates, the stopper linear counter gear 2540 and the counter shaft 2242a can also rotate, and the rotations can be counted by the counter 2238a. By tracking rotations of the stopper linear drive mechanism 2319, a position of a stopper (such as the stoppers 312, 3212 shown in FIGS. 3 and 32, respectively) of the stopper linear drive mechanism 2319 can be monitored.

Figure 26:
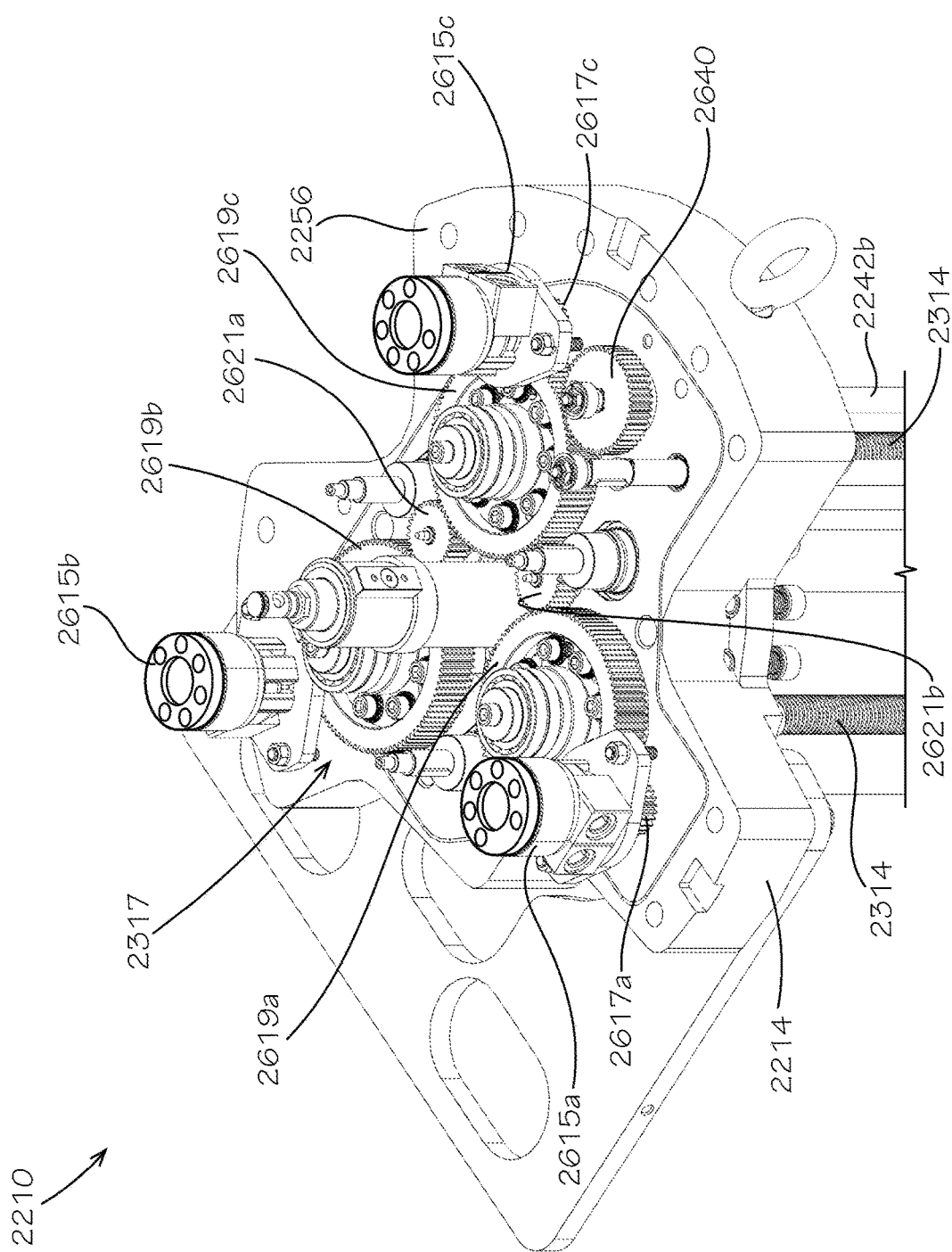
FIG. 26 is a detail view of a drilling linear drive mechanism of the machine of FIG. 22.

FIG. 26 is a detail view of the drilling linear drive mechanism 2317 of the machine 2210 of FIG. 22. The top housing 2214 is shown with the second housing plate 2254 (shown in FIG. 22), the motor 2515 (shown in FIG. 25), the motor drive gear 2517 (shown in FIG. 25), the plurality of stopper assembly driven gears 2519a,b,c (shown in FIG. 25), and the plurality of idler gears 2521a-g (shown in FIG. 25) further removed, amongst other removed components.

The drilling linear drive mechanism 2317 can comprise a plurality of motors 2615a,b,c, a plurality of drilling linear drive gears 2617a,c (the drilling linear drive gear 2617 attached to motor 2615b is not shown), a plurality of drilling linear driven gears 2619a,b,c, and a plurality of idler gears 2621a,b. The motors 2615a,b,c can be hydraulic, electric, pneumatic, or any other type of motor, for example and without limitation. The motors 2615a,b,c can be mounted to the second housing plate 2254 (shown in FIG. 22). The gears 2617a,c,2619a,b,c,2621a,b can be positioned between the second housing plate 2254 and the third housing plate 2256 when the top housing 2214 is assembled.

As demonstrated by the motors 2615a,c, each drilling linear drive gear 2617a,c can be coupled to one of the motors 2615a,b,c, respectively. Each drilling linear drive gear 2617a,c can mesh directly with one of the adjacent drilling linear driven gears 2619a,b,c, respectively. The drilling liner driven gears 2619a,b,c can each be rotationally fixed to one of the drilling guide rods 2314, respectively. The idler gear 2621a can mesh with both drilling linear driven gears 2619a,c, and the idler gear 2621b can mesh with both drilling linear driven gears 2619b,c. Engagement of the idler gears 2621a,b with the drilling linear driven gears 2619a,b,c can ensure that the drilling linear driven gears 2619a,b,c, and thus the drilling guide rods 2314, remain rotationally synchronized. In some aspects, the drilling linear drive mechanism 2317 can utilize one or more different transferring elements in place of or in addition to one or all of the idler gears 2621a,b, such as a chain, gear system, or belt, for example and without limitation.

A drilling linear counter gear 2640 can be rotationally fixed to the counter shaft 2242b, which in turn can be coupled to the counter 2238b (shown in FIG. 22). The drilling linear counter gear 2640 can mesh with drilling linear driven gear 2619c. Accordingly, when the drilling linear drive mechanism 2317 rotates, the drilling linear counter gear 2640 and the counter shaft 2242b can also rotate, and the rotations can be counted by the counter 2238b. By tracking rotations of the drilling linear drive mechanism 2317, a position of a drill bit (such as the drill bit 314, 3014 shown in FIGS. 3 and 30, respectively) of drilling linear drive mechanism 2317 can be monitored.

Figure 27:
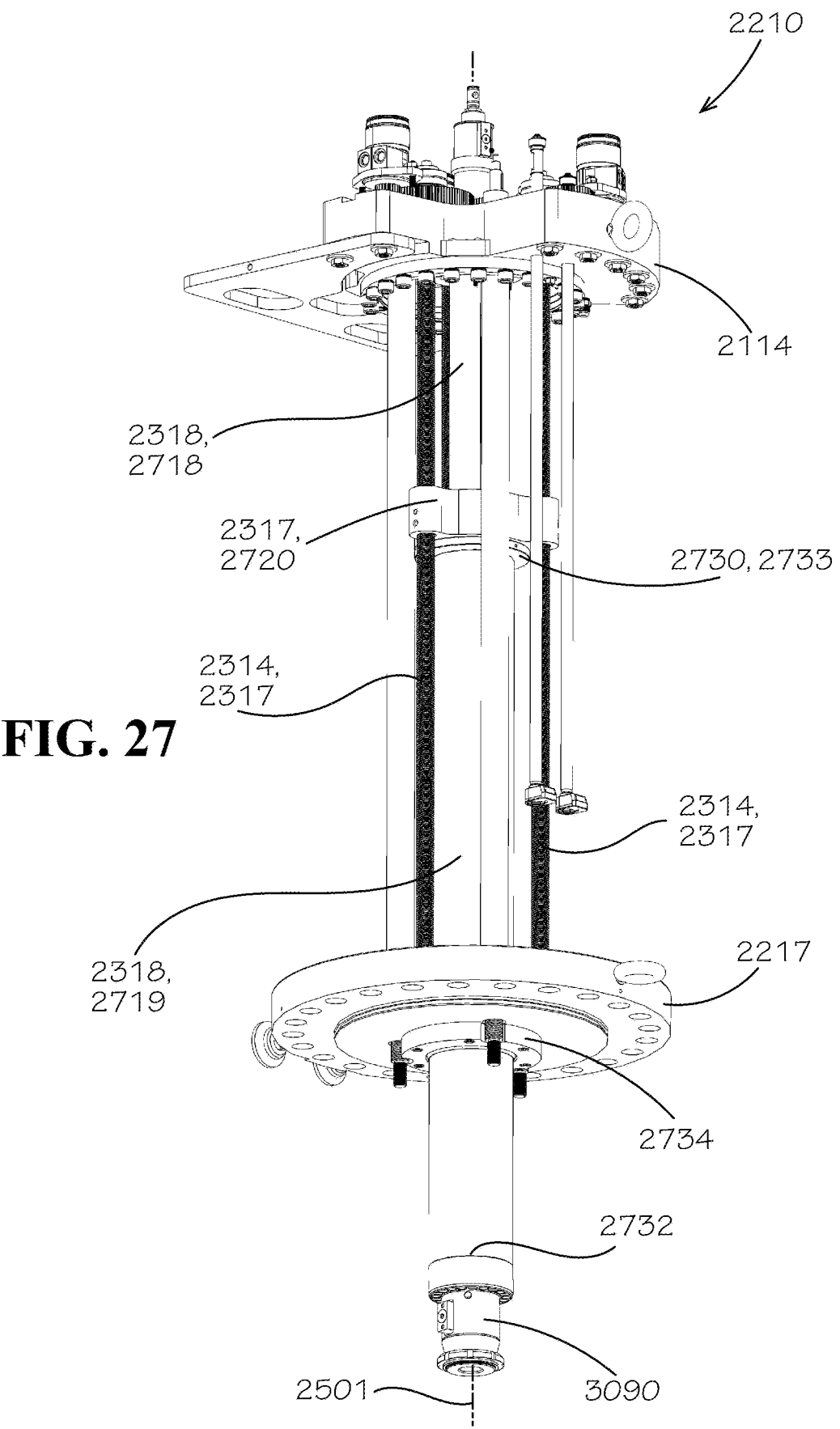
FIG. 27 is a side perspective view of the machine of FIG. 22 with a drilling bar of the machine of FIG. 22 shown in a partially extended configuration.

FIG. 27 is a side perspective view of the machine 2210 of FIG. 22 with the drilling bar assembly 2318 of the machine of FIG. 22 shown in a partially extended configuration. The machine 2210 is shown in the same partially disassembled state as in FIG. 26. The drilling bar assembly 2318 can comprise an upper drilling bar 2718, also referred to as an "upper rotating drilling bar," and a lower drilling bar 2719, also referred to as a "lower boring bar." The drilling linear drive mechanism 2317 can comprise a drilling bar plate 2720, also referred to as a "carrier." The drilling guide rods 2314 of the drilling linear drive mechanism 2317 can be threadedly engaged with the drilling bar plate 2720.

The lower drilling bar 2719 can be larger in diameter than the upper drilling bar 2718. The lower drilling bar 2719 can receive the upper drilling bar 2718. The upper drilling bar 2718 can be axially fixed between the top housing 2214 and the bottom flange 2217, relative to the axis 2501. The lower drilling bar 2719 can define a top end 2730 and a bottom end 2732. The top end 2730 can be axially secured to the drilling bar plate 2720, relative to the axis 2501. The drilling bar plate 2720 and the lower drilling bar 2719 can be configured to axially translate along the axis 2501, thereby telescoping relative to the upper drilling bar 2718.

Specifically, the drilling guide rods 2314 of the drilling linear drive mechanism 2317 can be rotated, which can cause the drilling bar plate 2720 (along with the lower drilling bar 2719) to axially translate along the axis 2501 due to the threaded engagement between the drilling bar plate 2720 and the drilling guide rods 2314. The drilling bar assembly 2318 is shown in a partially extended state. The drilling bar assembly 2318 can continue to be extended from this position to a fully extended state (not shown), wherein the drilling bar plate 2720 can be positioned adjacent to the bottom flange 2217. In a fully retracted state (shown in FIGS. 22 and 23), the drilling bar plate 2720 can be positioned adjacent to the top housing 2214.

The upper drilling bar 2718 and the lower drilling bar 2719 can be rotationally fixed relative to each other about the axis 2501, and the upper drilling bar 2718 and the lower drilling bar 2719 can be rotated about the axis 2501 relative to the drilling bar plate 2720. A plate bearing assembly 2733 can axially secure the top end 2730 of the lower drilling bar 2719 to the drilling bar plate 2720 while maintaining rotational freedom of the drilling bar assembly 2318 relative to the drilling bar plate 2720. A flange bearing assembly 2734 can be mounted to the bottom flange 2217. The flange bearing assembly 2734 can be configured to maintain axial alignment of the drilling bar assembly 2318 along the axis 2501. The lower drilling bar 2719 can rotate and axially translate along the axis 2501 relative to the flange bearing assembly 2734.

As discussed above in FIG. 24, the drilling rotation drive mechanism 2315 can be configured to rotate the drilling bar assembly 2318 (shown in FIG. 24) about the axis 2501, while axial translation of the lower drilling bar 2719 can be separately controlled by the drilling linear drive mechanism 2317.

The bottom end 2732 of the lower drilling bar 2719 can receive a drilling bar mount 3090, which can be configured to mount one or more tools to the drilling bar assembly 2318, as described in greater detail below with respect to FIG. 30.

Figure 28:
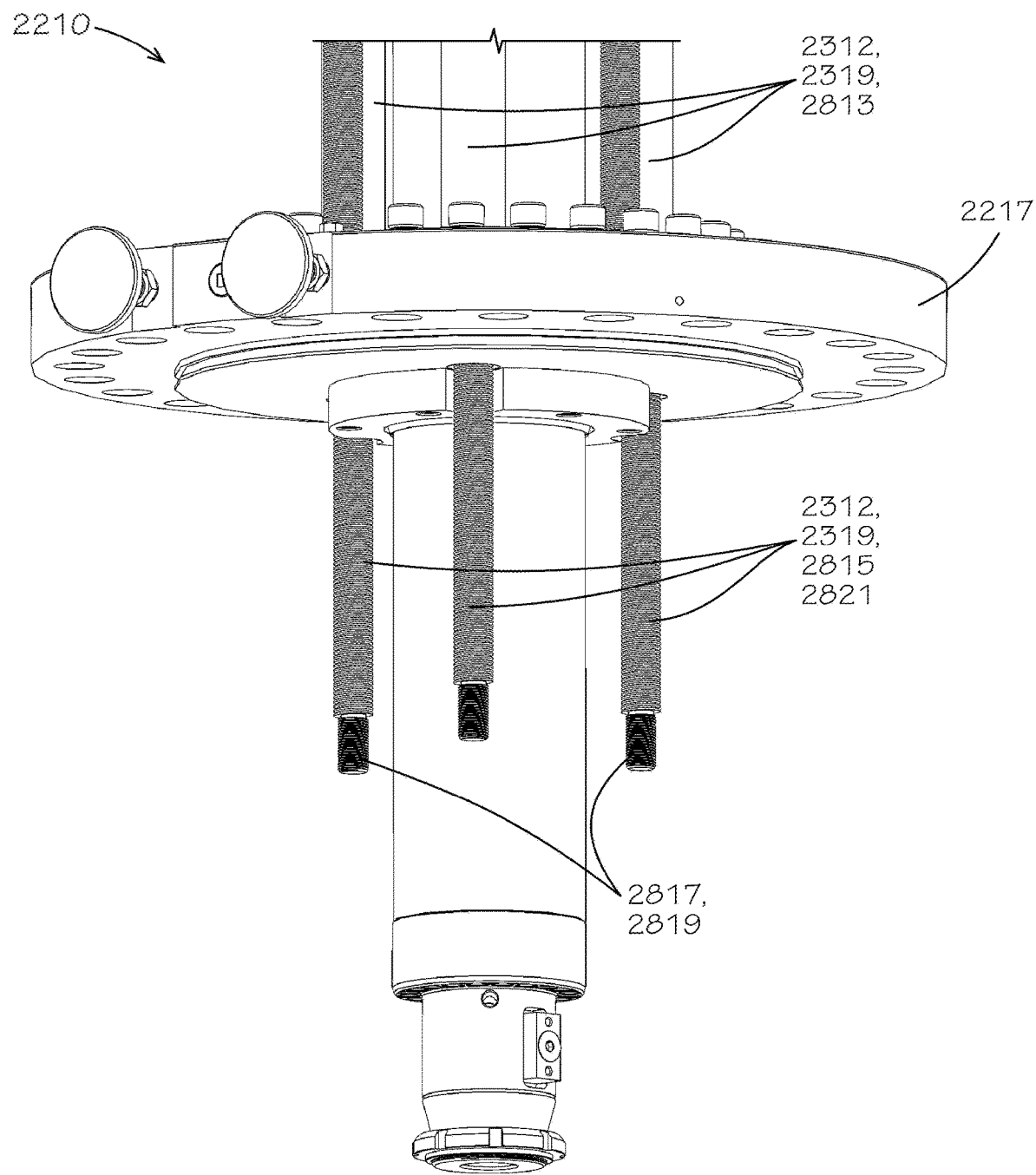
FIG. 28 is a detail view of the machine of FIG. 22 with a plurality of stopper guide assemblies of the machine shown in a partially extended configuration.

FIG. 28 is a detail view of the machine 2210 of FIG. 22 with the plurality of stopper guide assemblies 2312 of the stopper linear drive mechanism 2319 shown in a partially extended configuration. The machine 2210 is shown in the same partially disassembled state as in FIG. 26. As shown, each stopper guide assembly 2312 can comprise an upper guide member 2813 and a lower guide member 2815. Each lower guide member 2815 can define a bottom end 2817. In the present aspect, the bottom ends 2817 can define a reduced diameter. For example and without limitation, the bottom ends 2817 can define threaded portions 2819. The bottom ends 2817 can be configured for mounting a tool. For example and without limitation, the bottom ends 2817 can be configured to mount to the stopper frame 340 (shown in FIG. 3), which in turn can be utilized to mount the stopper 312,3212 (stopper 312 shown in FIG. 3; stopper 3212 shown in FIG. 32). Each lower guide member 2815 can also define male threading 2821 extending at least partially along the length of the lower guide member 2815. The male threading 2821 can be defined above the threaded portions 2819 of the bottom ends 2817. The male threading 2821 can be larger in diameter than the threaded portions 2819. In some aspects, the threaded portions 2819 can be a continuation of the male threading 2821, and the male threading 2821 and threaded portions 2819 can be of the same threading pattern.

Figure 29:
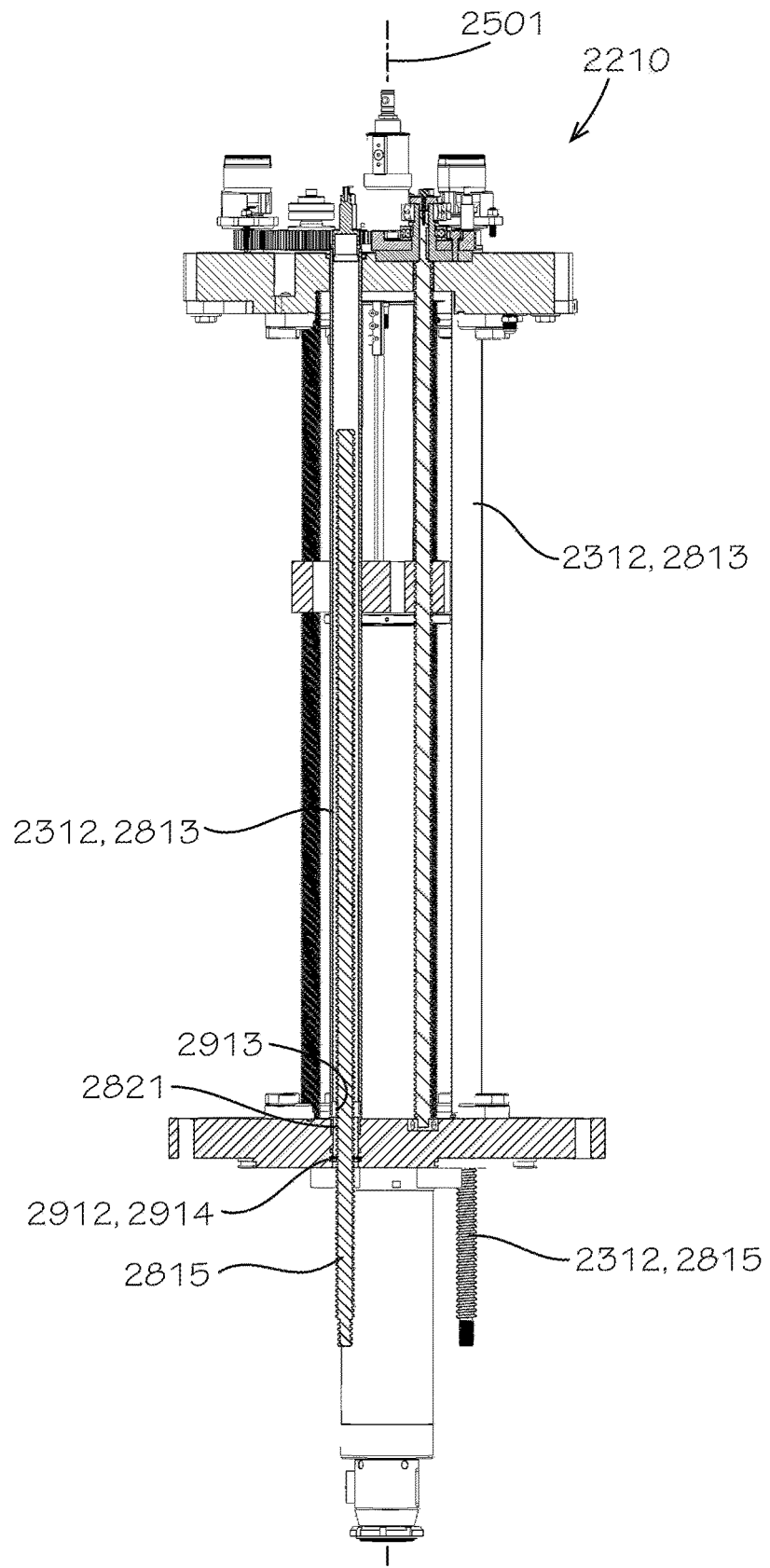
FIG. 29 is a cross-sectional view of the machine of FIG. 22, shown with one of the stopper guide assemblies bisected by the cross-sectional plane.

FIG. 29 is a cross-sectional view of the machine 2210 of FIG. 22, shown with one of the stopper guide assemblies 2312 bisected by the cross-sectional plane. The machine 2210 is shown in the same partially disassembled state as in FIG. 26. As shown, the upper guide members 2813 can each be at least partially hollow, and the upper guide members 2813 can receive the lower guide members 2815. The upper guide members 2813 can define female threading 2913 extending at least partially along the length of the upper guide members 2813. In the present aspect, the female threading 2913 can be defined by a threaded insert 2912 positioned near a bottom end 2914 of each respective lower guide member 2815. The female threading 2913 can mesh with the male threading 2821.

The upper guide members 2813 can be rotationally fixed to the stopper assembly driven gears 2519a,b,c, (shown in FIG. 25) of the stopper linear drive mechanism 2319. The stopper linear drive mechanism 2319 can rotate the upper guide members 2813, as described above with respect to FIG. 25. The lower guide members 2815 can be rotationally fixed. Accordingly, when the upper guide members 2813 are rotated, the lower guide members 2815 can telescope inwards or outwards from the upper guide members 2813 (depending on the direction of rotation of the upper guide members 2813) in a direction parallel to the axis 2501. Accordingly, when a tool is connected to the lower guide members 2815 of the stopper guide assemblies 2312, the tool can be advanced or retracted by rotating the upper guide members 2813.

Figure 30:
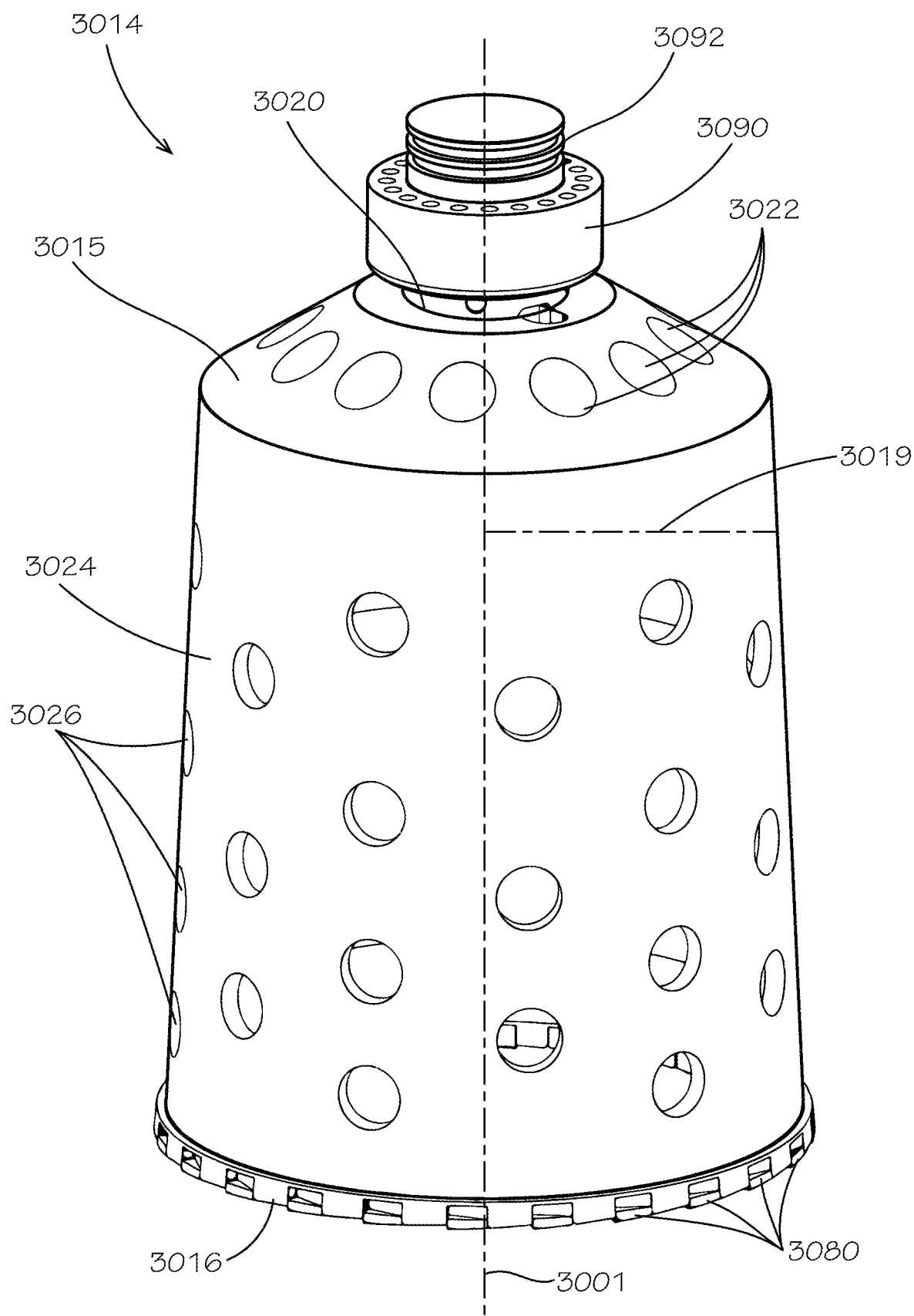
FIG. 30 is a perspective side view of another aspect of a drill bit in accordance with another aspect of the present disclosure.

FIG. 30 is a perspective side view of another aspect of a drill bit 3014 in accordance with another aspect of the present disclosure. The drilling bar mount 3090 can be mounted to a top end 3015 of the drill bit 3014. The drilling bar mount 3090 can extend into a top opening 3020 defined at the top end 3015 of the drill bit 3014. The drilling bar mount 3090 can define defining threading 3092 for mounting the drill bit 3014 to the drilling bar assembly 2318 (shown in FIG. 23).

The top end 3015 can be a flat surface or slope downwards to a sidewall 3024 of the drill bit 3014. The top end 3015 can define a plurality of upper holes 3022. The upper holes 3022 can extend through the drill bit 3014 in a substantially longitudinal direction. The sidewall 3024 can extend from the top end 3015 to a bottom end 3016 of the drill bit 3014. A rotational axis 3001 of the drill bit 3014 can extend from the top end 3015 to the bottom end 3016. The sidewall 3024 can be tapered. Specifically, a radius 3019 of the sidewall 3024 can decrease from the bottom end 3016 towards the top end 3015. In the present aspect, the sidewall 3024 can define a frustoconical shape. The sidewall 3024 can define a plurality of sidewall holes 3026. The sidewall holes 3026 can extend through the drill bit 3014 in a radial direction. The drill bit 3014 can comprise one or more cutting appurtenances, such as a plurality of cartridges 3080 positioned at the bottom end 3016 of the drill bit 3014.

Figure 31:
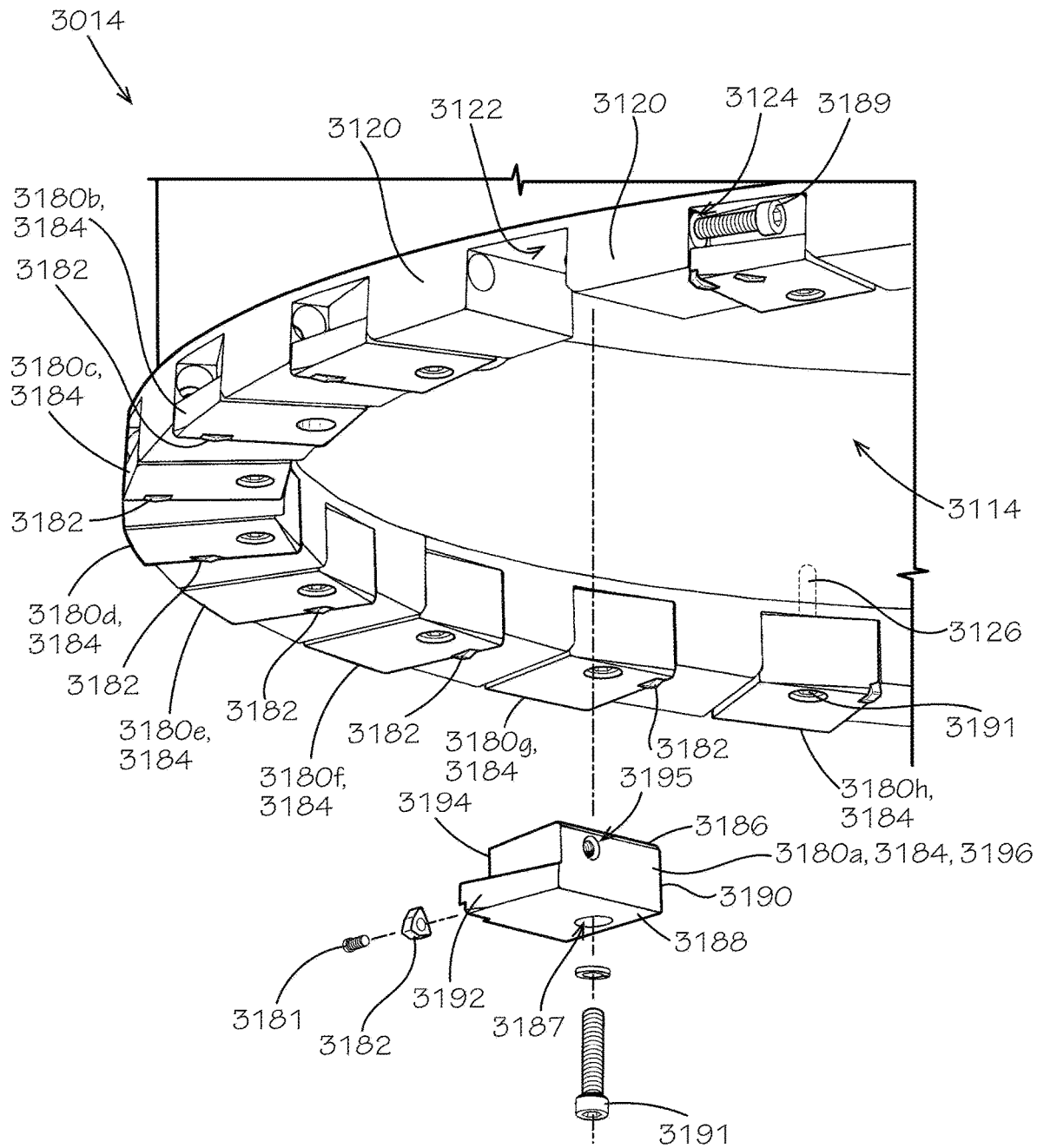
FIG. 31 is a detailed partially exploded view of the drill bit of FIG. 30.

FIG. 31 is a detailed partially exploded view of the drill bit 3014 of FIG. 30. The drill bit 3014 can define an opening 3114 at the bottom end 3016. The plurality of cartridges 3080 can be circumferentially spaced around the opening 3114 at the bottom end 3016 of the drill bit 3014. The plurality of cartridges 3080 can be arranged as one or more series of individual cartridges 3180a-h. In the present aspect, each series can comprise eight cartridges 3180, which can vary slightly from one another. The series of cartridges 3180a-h can be repeated around the opening 3114. For example and without limitation, in the present aspect, the plurality of cartridges 3080 can repeat the series 3180a-h three times. In other aspects, each series can comprise greater or fewer than eight cartridges, and the series can be repeated greater or fewer than three times.

The bottom end 3016 can be defined by a plurality of mounting lugs 3120, which can be circumferentially spaced around the opening 3114. A cartridge pocket 3122 can be defined between each pair of adjacent mounting lugs 3120 of the plurality of mounting lugs 3120. Each mounting lug 3120 can define a first fastener hole 3124. The fastener holes 3124 can be any holes that accept appropriate fasteners. In the present aspect, the first fastener holes 3124 can be counter bore holes extending through the respective mounting lugs 3120 from one cartridge pocket 3122 to the adjacent cartridge pocket 3122. In some aspects, the first fastener hole 3124 can define a different shape, such as a countersink hole or any other suitable shape, for example and without limitation. The first fastener holes 3124 can be formed parallel to a tangential direction of the circumference of the opening 3114 (in other words, perpendicular to a radial direction of the rotational axis 3001 (shown in FIG. 30)). A second fastener hole 3126 (represented by broken lines above cartridge 3180*h*) can extend upwards into the sidewall 3024 from each cartridge pocket 3122 in a direction parallel to the rotational axis 3001 (in other words, perpendicular to the upper surface defined by the cartridge pocket 3122).

Each cartridge 3080*a-h* can comprise a cutting tool 3182 and a mounting block 3184. The cutting tools 3182 can be inserts similar to those commonly utilized for milling, turning, and drilling operations, for example and without limitation. The cutting tools 3182 can comprise materials such as iron, steel, carbide, cubic boron nitride, alumina, ceramic, diamond(s), polycrystalline diamond, or other suitable materials. The cutting tools 3182 can be configured to cut plastics, metals, composites (such as fiberglass for example and without limitation), or other materials commonly utilized in the construction of pipelines.

Each mounting block 3184 can define a top side 3186 and a bottom side 3188. A fastener hole 3187 can extend through the mounting block 3184 from the bottom side 3188 to the top side 3186. Each mounting block 3184 can also define a radially inner side 3190 and a radially outer side 3192. Each mounting block 3184 can further define a front side 3194 and a rear side 3196.

As demonstrated by the rear side 3196, the front side 3194 and the rear side 3196 can each define a threaded fastener hole 3195. A fastener 3181 can secure the cutting tool 3182 to the front side 3194. As demonstrated by individual cartridges 3180*a-h*, the radial position of the cutting tool 3182 along the front side 3194 can vary. For example, the cutting tool 3182 of the cartridge 3180*a* can be positioned to extend slightly radially outwards from the radially outer side 3192 when the cutting tool 3182 is secured to the front side 3194. By contrast, the cutting tool 3182 of the cartridge 3180*h* can extend slightly radially inwards from the radially inner side 3190. The cutting tools 3182 of cartridges 3180*bg* can be incrementally radially spaced between the radially inner side 3190 and the radially outer side 3192 for each respective mounting block 3184. Accordingly, the cutting tools 3182 of the cartridges 3180*a-h* can make a series of cuts that collectively span a radial width of the mounting blocks 3184. This progression can be repeated around the bottom end 3016 of the drill bit 3014 by each series of cartridge 3080*a-h*.

With the cutting tool 3182 secured to the mounting block 3184, the cartridge 3080 can be inserted into the cartridge pocket 3122. In some aspects, inserting the cartridge 3080 into the cartridge pocket 3122 can secure the cutting tool 3182 between the front side 3194 and the adjacent mounting lug 3120. The mounting lug 3120 can also prevent removal of the fastener 3181 when the cartridge 3080 is positioned within the cartridge pocket 3122.

The cartridge 3080 can be secured within the cartridge pocket 3122 by the fasteners 3189,3191. The fastener 3189 can extend through the first fastener hole 3124 of the adjacent mounting lug 3120 and into the threaded fastener hole 3195 of the rear side 3196. As demonstrated by cartridges 3180*a,h*, the fastener 3191 can extend through the fastener hole 3187 of the mounting block 3184 and into the second fastener hole 3126. In some aspects, the cartridges 3080 can exclude the mounting blocks 3184. In such aspects, the cutting tools 3182 can be coupled directly to the drill bit 3014.

Figure 32:
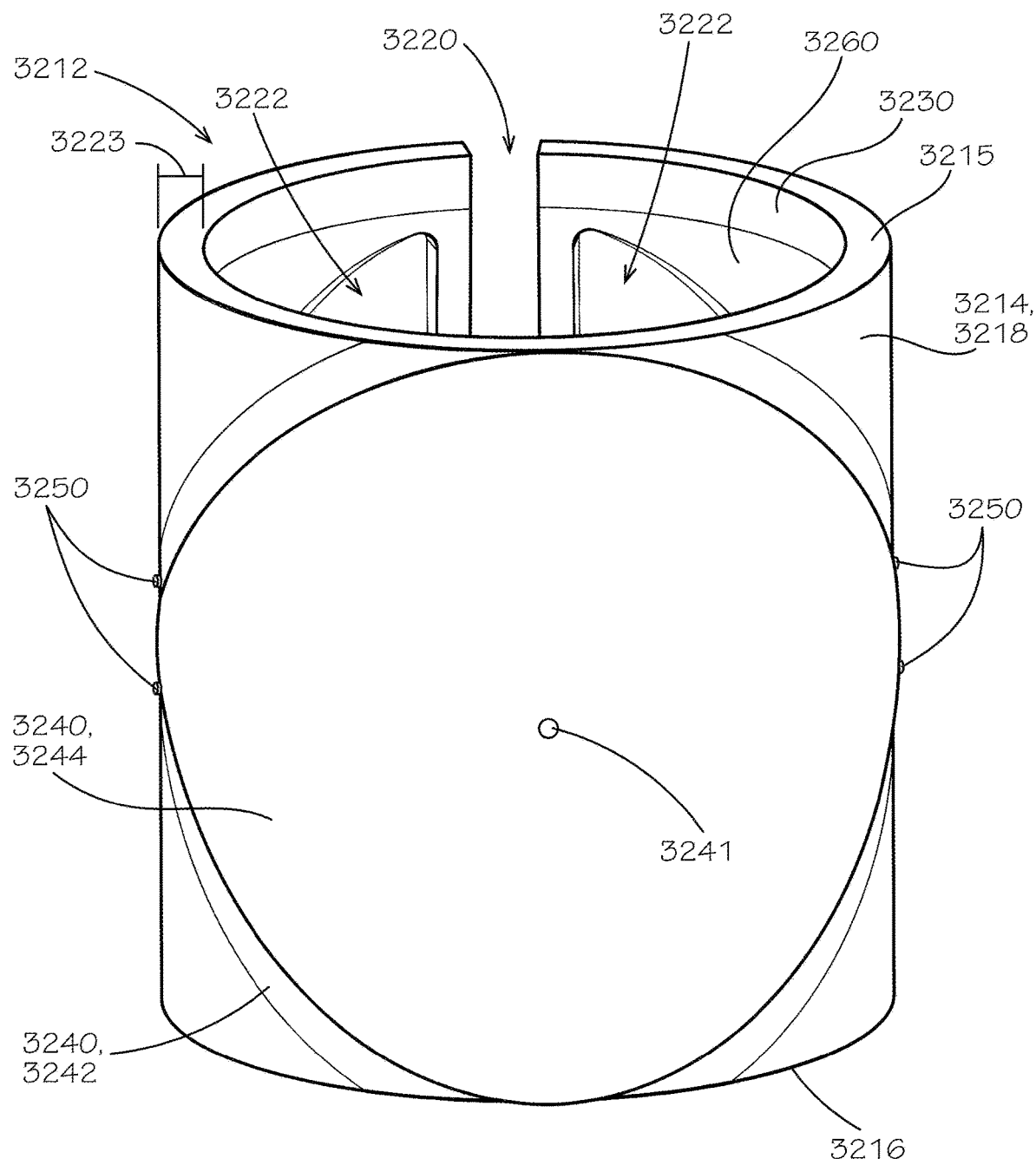
FIG. 32 is a front view of another aspect of a stopper in accordance with another aspect of the present disclosure.

FIG. 32 is a front view of another aspect of a stopper 3212 in accordance with another aspect of the present disclosure. The stopper 3212 can be mounted to the stopper frame 340 (shown in FIG. 3), which in turn can be mounted to the stopper guide assemblies 212,2312 (stopper guide assemblies 212 show in FIG. 2; stopper guide assemblies 2312 shown in FIG. 23).

The stopper 3212 can comprise a main body 3214. The main body 3214 can comprise a strong but resilient material capable of withstanding high pressures, such as a metal or hard plastic. In some aspects, the main body 3214 can comprise steel, iron, aluminum, nylon, polyvinyl chloride, or any other suitable material.

The main body 3214 can define a top end 3215 and a bottom end 3216. The main body 3214 can define an outer surface 3218, which can be a radially outer surface of the main body 3214. The outer surface 3218 can extend from the top end 3215 to the bottom end 3216. The outer surface 3218 can be substantially cylindrical in shape, with the exception that the main body 3214 can define at least one cutout 3222 and a gap 3220 (also referred to as a "slot") extending from the top end 3215 to the bottom end 3216. The gap 3220 is shown extending in a longitudinal direction; however, this orientation should not be viewed as limiting. In various aspects, the gap 3220 can define any suitable shape. In some aspects, the main body 3214 can define the gap 3220 and omit the at least one cutout 3222.

The main body 3214 can define an inner surface 3230, which can be a radially inner surface of the main body 3214. The inner surface 3230 can extend from the top end 3215 to the bottom end 3216. The inner surface 3230 can be substantially frustoconical in shape, with the with the exception that the main body 3214 can define the gap 3220 and the at least one cutout 3222.

A thickness 3223 of the main body 3214 can be defined between the outer surface 3218 and the inner surface 3230. The thickness 3223 can be defined in a radial direction. The thickness 3223 can taper from the top end 3215 to the bottom end 3216, as demonstrated by the gap 3220 and the at least one cutout 3222 in FIGS. 32 and 33. Accordingly, the main body 3214 can define a trapezoidal or triangular cross-sectional shape, for example and without limitation.

The stopper 3212 can further comprise a sealing member 3240. In the present aspect, the sealing member 3240 can be of composite construction. The sealing member 3240 can comprise a base material 3242 and a sealing material 3244. The base material 3242 can be selected to provide support for the sealing material 3244. For example, the base material 3242 can be a thin piece of metal, plastic, or other suitable material offering sufficient strength and resiliency to conform to and flex with the main body 3214 while substantially maintaining a shape of the sealing material 3244. The sealing material 3244 can be a material that is softer and more resilient than the base material 3242, such as a rubber, soft plastic, elastomer, or other suitable material. The sealing material 3244 can be selected to provide a strong seal with one of the ends 1199 of the pipeline 199, as shown and discussed with respect to FIGS. 11-13, above.

In the present aspect, the sealing material 3244 can be over-molded onto the base material 3242. In some aspects, the sealing material 3244 can be deposited on the base material 3242 in a liquid form and allowed to solidify, cure, vulcanize, or otherwise form as a solid that is bonded to the base material 3242. In some aspects, the sealing material 3244 can be adhered to the base material 3242 with an adhesive. In some aspects, the sealing member 3240 can comprise a single material. For example and without limitation, soft plastics or metals or firmer rubber and elastomeric materials can be utilized.

The sealing member 3240 can be secured to the outer surface 3218 of the main body 3214. A center 3241 of the sealing member 3240 can be positioned opposite from the gap 3220. The sealing member 3240 can extend circumferentially around at least a portion of the main body 3214. In the present aspect, the sealing member 3240 can extend around between about a quarter to about a half of a circumference of the main body 3214. More preferably, the sealing member 3240 can extend around between about a third and about a half of the circumference of the main body 3214. The sealing member 3240 can be secured to the main body 3214 by one or more fasteners 3250. The fasteners 3250 can be screws, rivets, bolts, or other suitable fasteners. The sealing member 3240 can be replaced as needed by removing the fasteners 3250 and the old sealing member 3240 and securing a new sealing member 3240 in its place with the fasteners 3250.

The stopper 3212 can further comprise a liner 3260. The liner 3260 can be coupled to the inner surface 3230 of the main body 3214. The liner 3260 can comprise a bearing material with a low friction coefficient, such as a metal or plastic. For example, the liner 3260 can comprise polytetrafluoroethylene or bronze, for example and without limitation. The liner 3260 can be configured to reduce friction between the stopper 3212 and the drill bit 314,3014 (drill bit 314 shown in FIG. 3; drill bit 3014 shown in FIG. 30) when the drill bit 314,3014 is drawn upwards and received within the stopper 3212, thereby engaging the drill bit 314,3014 with the substantially frustoconical shape of the inner surface 3230.

Figure 33:
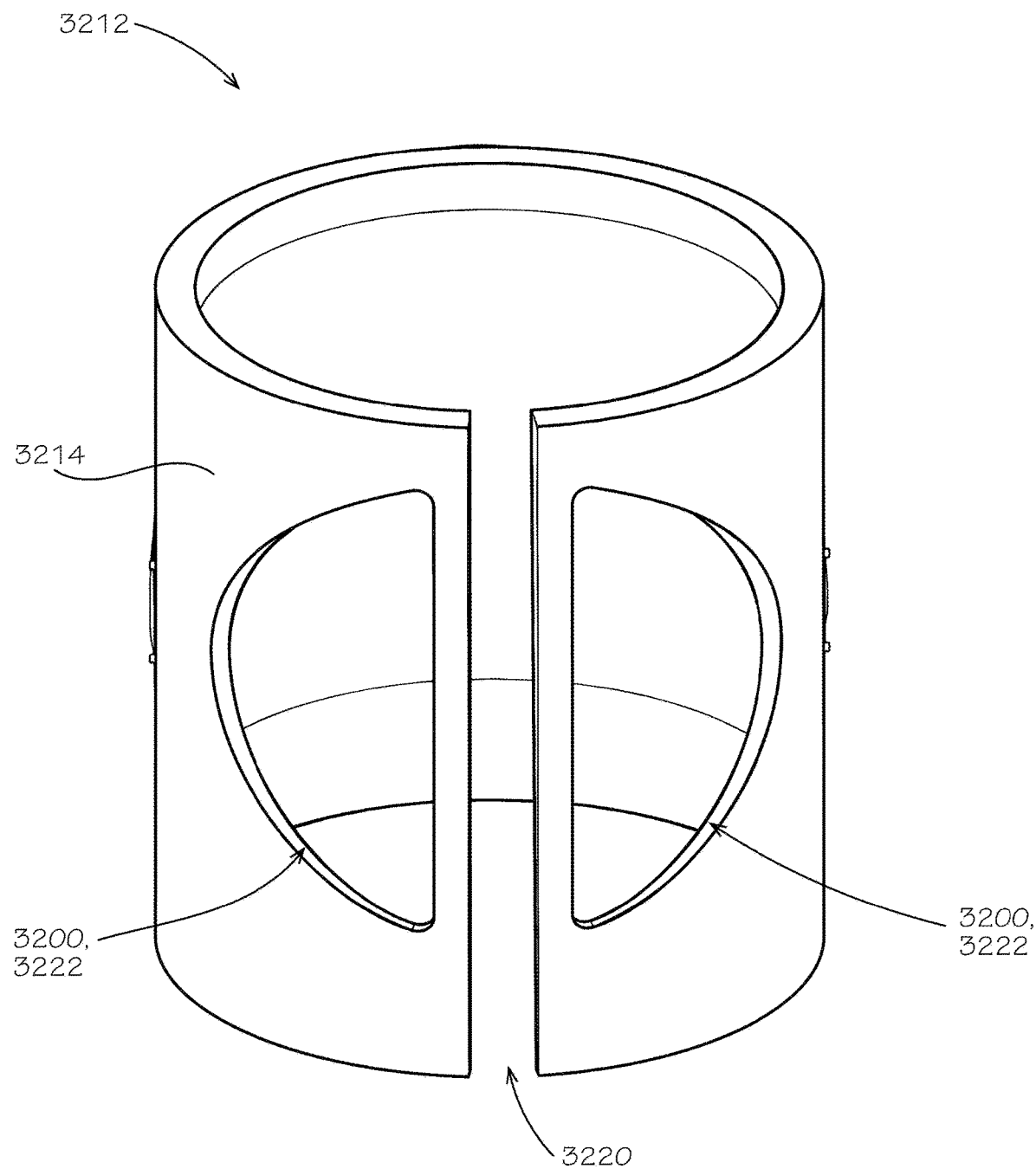
FIG. 33 is a rear view of the stopper of FIG. 32.

FIG. 33 is a rear view of the stopper 3212 of FIG. 32. As shown, the main body 3214 can define at least one cutout 3222. In the present aspect, the main body 3214 can define two cutouts 3222, with one positioned on either side of the gap 3220. In the present aspect, each cutout 3222 can be substantially semi-circular in shape; however, this shape should not be viewed as limiting. The at least one cutout 3222 can optionally define a stopper port 3200 of the stopper 3212.

The gap 3220 can provide clearance for the stopper 3212 to circumferentially expand when the drill bit 314,3014 (drill bit 314 shown in FIG. 3; drill bit 3014 shown in FIG. 30) is drawn upwards into the stopper 3212. The cutouts 3222 can be aligned with one of the ends 1199 of the pipeline 199, as shown and discussed with respect to FIGS. 11-13, above. For example, the sealing member 3240 (shown in FIG. 32) can be sealed with the downstream end 1199 of the pipeline 199 and the cutouts 3222 can be aligned with the upstream end 1199 of the pipeline 199. Fluids carried by the pipeline 199 can flow through the gap 3220 and/or cutouts 3222 and through the drill bit 314,3014 upwards into the machine 110,2210 (machine 110 shown in FIG. 1; machine 2210 shown in FIG. 21), where the fluids can temporarily bypass the downstream end 1199 of the pipeline 199.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A machine comprising:
a tool housing defining a housing cavity;
a drill bit defining at least one hole and selectively repositionable between a first orientation and a second orientation, the drill bit coupled to a first linear drive mechanism, the drill bit linearly repositionable along an axis by the first linear drive mechanism about and between a first retracted position and an extended position, the drill bit positioned within the housing cavity in the first retracted position, the drill bit positioned external to the housing cavity in the extended position, the drill bit is linearly repositionable to a first sealing position along the axis between the first retracted position and the extended position; and
a stopper defining a stopper port, the stopper coupled to a second linear drive mechanism, the stopper defines a cavity and a circumference, the stopper linearly repositionable along the axis by the second linear drive mechanism about and between a second retracted position and a second sealing position, the stopper positioned within the housing cavity in the second retracted position, the stopper positioned external to the housing cavity in the second sealing position, the drill bit nested at least partially within the cavity when the drill bit is in the first sealing position and the stopper is in the second sealing position, the circumference defining a first value when the drill bit is positioned external to the cavity, the circumference defining a second value when the drill bit is nested at least partially within the cavity, the second value being greater than the first value, wherein:
when the drill bit is in the first orientation in the first sealing position and the stopper is in the second sealing position, the hole in the drill bit is aligned with the stopper port in the stopper; and when the drill bit is in the second orientation in the first sealing position and the stopper is in the second sealing position, the hole is not aligned with the stopper port, and the drill bit seals the stopper port.

2. The machine of claim 1 wherein the stopper comprises a plurality of wedges positioned within the cavity.

3. The machine of claim 1, wherein the drill bit defines a frustoconical portion.

4. The machine of claim 1, wherein the drill bit is rotatable about the axis.

5. The machine of claim 1, wherein the drill bit is nested at least partially within the cavity when the drill bit is in the first retracted position and the stopper is in the second retracted position.

6. The machine of claim 1, wherein when the drill bit is in the extended position, the stopper is repositionable between the second retracted position and the second sealing position independent of the drill bit.

7. A machine comprising:
a tool housing defining a housing cavity;
a drill bit coupled to a first linear drive mechanism, the drill bit defining at least one hole, the drill bit selectively repositionable between a first orientation and a second orientation, the drill bit linearly repositionable along an axis by the first linear drive mechanism about and between a first retracted position and an extended position, the drill bit positioned within the housing cavity in the first retracted position, the drill bit positioned external to the housing cavity in the extended position, the drill bit linearly repositionable to a first sealing position along the axis between the first retracted position and the extended position; and
a stopper coupled to a second linear drive mechanism, the stopper defining a stopper port, the stopper linearly repositionable along the axis by the second linear drive mechanism about and between a second retracted position and a second sealing position, the stopper positioned within the housing cavity in the second retracted position, the stopper positioned external to the housing cavity in the second sealing position, wherein:
when the drill bit is in the first orientation in the first sealing position and the stopper is in the second sealing position, the hole in the drill bit is aligned with the stopper port in the stopper; and
when the drill bit is in the second orientation in the first sealing position and the stopper is in the second sealing position, the hole is not aligned with the stopper port, and the drill bit seals the stopper port.

8. The machine of claim 7, wherein the drill bit defines a frustoconical portion.

9. The machine of claim 7, wherein the drill bit is rotatable about the axis.

10. The machine of claim 7, wherein the stopper defines a cavity, and wherein the drill bit is nested at least partially within the cavity when the drill bit is in the first retracted position and the stopper is in the second retracted position.

11. The machine of claim 7, wherein when the drill bit is in the extended position, the stopper is repositionable between the second retracted position and the second sealing position independent of the drill bit.

12. A machine comprising:
a tool housing defining a housing cavity;
a drill bit coupled to a first linear drive mechanism, the drill bit linearly repositionable along an axis by the first linear drive mechanism about and between a first retracted position and an extended position, the drill bit positioned within the housing cavity in the first retracted position, the drill bit positioned external to the housing cavity in the extended position, the drill bit repositionable to a first sealing position along the axis between the first retracted position and the extended position, the drill bit defining a hole, the drill bit being selectively repositionable between a first orientation and a second orientation; and
a stopper coupled to a second linear drive mechanism, the stopper defining a cavity, the stopper linearly repositionable along the axis by the second linear drive mechanism about and between a second retracted position and a second sealing position, the stopper positioned within the housing cavity in the second retracted position, the stopper positioned external to the housing cavity in the second sealing position, the drill bit nested at least partially within the cavity when the drill bit is in the first retracted position and the stopper is in the second retracted position, the stopper defining a stopper port, wherein:
when the drill bit is in the first orientation in the first sealing position and the stopper is in the second sealing position, the hole in the drill bit is aligned with the stopper port in the stopper; and
when the drill bit is in the second orientation in the first sealing position and the stopper is in the second sealing position, the hole is not aligned with the stopper port, and the drill bit seals the stopper port.

13. The machine of claim 12, wherein the stopper comprises a plurality of wedges positioned within the cavity.

14. The machine of claim 12, wherein the drill bit defines a frustoconical portion.

15. The machine of claim 12, wherein when the drill bit is in the extended position, the stopper is repositionable between the second retracted position and the second sealing position independent of the drill bit.

16. The machine of claim 12, wherein the drill bit is rotatable about the axis.

* * * * *